United States Patent
Hopper

(10) Patent No.: US 9,714,561 B2
(45) Date of Patent: Jul. 25, 2017

(54) SEPARATOR AND METHOD OF SEPARATION

(71) Applicant: Cameron International Corporation, Houston, TX (US)

(72) Inventor: Hans Paul Hopper, Scotland (GB)

(73) Assignee: Cameron International Corporation, Houston, TX (US)

(*) Notice: Subject to any disclaimer, the term of this patent is extended or adjusted under 35 U.S.C. 154(b) by 675 days.

(21) Appl. No.: 14/092,380

(22) Filed: Nov. 27, 2013

(65) Prior Publication Data
US 2014/0158364 A1 Jun. 12, 2014

Related U.S. Application Data

(62) Division of application No. 12/305,129, filed as application No. PCT/GB2007/022200 on Jun. 15, 2007, now Pat. No. 8,617,405.

(51) Int. Cl.
*E21B 43/36* (2006.01)
*B01D 21/26* (2006.01)
(Continued)

(52) U.S. Cl.
CPC .......... *E21B 43/36* (2013.01); *B01D 17/0217* (2013.01); *B01D 19/0052* (2013.01);
(Continued)

(58) Field of Classification Search
CPC ....... E21B 43/46; B01D 21/267; B01D 21/10; B01D 17/0217; B01D 21/245;
(Continued)

(56) References Cited

U.S. PATENT DOCUMENTS

| | | |
|---|---|---|
| 2,717,695 A | 9/1955 | Martin |
| 2,727,695 A | 12/1955 | Harries |

(Continued)

FOREIGN PATENT DOCUMENTS

| | | |
|---|---|---|
| DE | 202006004089 U1 | 5/2006 |
| EP | 0712654 A2 | 5/1996 |

(Continued)

OTHER PUBLICATIONS

International Search Report and Written Opinion dated Dec. 19, 2007 for PCT Application No. PCT/GB2007/002220 filed Jun. 15, 2007.

*Primary Examiner* — David A Reifsnyder
(74) *Attorney, Agent, or Firm* — Chamberlain Hrdlicka

(57) ABSTRACT

A method of separating a multiphase fluid, the fluid including a relatively high density component and a relatively low density component, that includes introducing the fluid into a separation region; imparting a rotational movement into the multiphase fluid; forming an outer annular region of rotating fluid of predetermined thickness within the separation region; and forming and maintaining a core of fluid in an inner region. Fluid entering the separation vessel is directed into the outer annular region and the thickness of the outer annular region is such that the high density component is concentrated and substantially contained within this region, the low density component being concentrated in the rotating core. A separation system employing the method is also provided. The method and system are particularly suitable for the separation of solid debris from the fluids produced by a subterranean oil or gas well at wellhead flow pressure.

16 Claims, 11 Drawing Sheets

(51) Int. Cl.
  B01D 21/00    (2006.01)
  B01D 21/02    (2006.01)
  B01D 21/24    (2006.01)
  B01D 19/00    (2006.01)
  B04C 5/04     (2006.01)
  B04C 5/13     (2006.01)
  B04C 5/14     (2006.01)
  B04C 5/15     (2006.01)
  B01D 17/02    (2006.01)

(52) U.S. Cl.
  CPC ......... *B01D 21/0012* (2013.01); *B01D 21/10* (2013.01); *B01D 21/245* (2013.01); *B01D 21/2411* (2013.01); *B01D 21/2494* (2013.01); *B01D 21/267* (2013.01); *B04C 5/04* (2013.01); *B04C 5/13* (2013.01); *B04C 5/14* (2013.01); *B04C 5/15* (2013.01); *B01D 21/2483* (2013.01); *B01D 2221/04* (2013.01)

(58) Field of Classification Search
  CPC ............ B01D 19/0052; B01D 21/0012; B01D 21/2483; B01D 21/2411; B01D 21/2494; B01D 2221/04; B04C 5/04; B04C 5/13; B04C 5/14; B04C 5/15
  See application file for complete search history.

(56) References Cited

U.S. PATENT DOCUMENTS

| | | | |
|---|---|---|---|
| 3,724,674 A * | 4/1973 | Loison | B04C 5/04 209/732 |
| 3,898,068 A | 8/1975 | McNeil | |
| 4,120,795 A | 10/1978 | Laval, Jr. | |
| 4,265,741 A | 5/1981 | Im | |
| 4,966,703 A | 10/1990 | Kalnins et al. | |
| 5,028,318 A | 7/1991 | Aslin | |
| 5,104,520 A | 4/1992 | Maronde et al. | |
| 5,252,229 A | 10/1993 | Rojey et al. | |
| 5,570,744 A | 11/1996 | Weingarten et al. | |
| 5,669,948 A | 9/1997 | Broettgaardh et al. | |
| 5,711,374 A | 1/1998 | Kjos | |
| 6,190,543 B1 | 2/2001 | Christiansen | |
| 6,893,558 B1 | 5/2005 | McGee et al. | |
| 7,413,669 B2 * | 8/2008 | Gonzalez | B04C 5/04 209/715 |
| 8,617,405 B2 * | 12/2013 | Hopper | B01D 17/0217 166/267 |
| 2004/0217050 A1 | 11/2004 | Schmidt et al. | |
| 2005/0006150 A1 | 1/2005 | Sims et al. | |
| 2012/0211230 A1 * | 8/2012 | Anderson | E21B 43/36 166/335 |

FOREIGN PATENT DOCUMENTS

| | | | | |
|---|---|---|---|---|
| FR | 2134520 | A5 | 12/1972 | |
| FR | 2382273 | A1 | 9/1978 | |
| GB | 769855 | A | 3/1957 | |
| GB | 1538512 | A | 1/1979 | |
| GB | 1585293 | A | 2/1981 | |
| GB | 2219227 | A | 12/1989 | |
| GB | 2231818 | A | 11/1990 | |
| GB | 2271520 | A | 4/1994 | |
| GB | 2353236 | A | 2/2001 | |
| GB | WO 2007144631 | A2 * | 12/2007 | ......... B01D 17/0217 |
| JP | 55155753 | U | 12/1980 | |
| SU | 638382 | A1 | 12/1978 | |
| WO | 9622836 | A1 | 8/1996 | |
| WO | 0187453 | A2 | 11/2001 | |
| WO | 02099249 | A1 | 12/2002 | |
| WO | 2005058503 | A1 | 6/2005 | |
| WO | 2005089950 | A | 9/2005 | |

* cited by examiner

SEPARATOR AND METHOD OF SEPARATION

STATEMENT REGARDING FEDERALLY SPONSORED RESEARCH OR DEVELOPMENT

Not Applicable.

BACKGROUND

The present invention is related to a separator and a method of separation. The separator and method find particular use in the separation of multi-phase mixtures, especially those containing gases, liquids and solids. The present invention is particularly suitable for, but not limited to, application in the separation of the products of oil and gas wells on land, on a platform, or especially in subsea locations.

The conventional approach to for the development of subsea hydrocarbon producing fields is to establish a plurality of subsea wells connected through a subsea infrastructure, pipelines and risers to a surface processing facility. As a result, solids in the well flow are currently carried in the fluid to the surface processing facility. The surface processing facility may be a floating production vessel or a platform. The surface processing facility has typically included separation equipment, to separate sand, gas and water from the oil produced from the wells. Gas and water recovered in this way are frequently reinjected at the seabed into the wells. This necessarily entails pumping the gas and water back down a series of pipelines and risers to the seabed.

A new approach to this problem has been to dispense with much of the processing facilities at the surface and to locate the relevant installations on the seabed at a location adjacent to or convenient to the production wells. The object is to remove the extensive infrastructure needed to bring all the produced streams to the surface and to return significant portions to the seabed for reinjection. While such an arrangement indeed reduces the capital expenditure and operating costs of the installations, it is accompanied by significant problems.

With processing equipment, such as water, gas and solid separators, situated on surface vessels or platforms, the servicing and maintenance of the components is relatively straightforward, with access to the equipment being readily available. However, this is not the situation with subsea installations, in particular those beyond safe diver depth. Rather, access to the equipment located on the seabed can be by either robotic and remotely controlled equipment or by retrieving equipment to the surface for repair and/or servicing. Therefore, intervention is very limited, with the ability to access the equipment decreasing as the depth of the installation below the surface increases. It will thus be appreciated that the failure of equipment located on the seabed represents a major operational problem and a high intervention expenditure. Consequently, the frequency of component failure must be minimised, in particular if the option of a subsea installation is to be economically viable.

A particular problem arises as a result of solids produced from subsea wells. It is frequently the case that subsea wells produce a significant quantity of solid formation material, together with the various fluid phases. The solid formation materials include coarse, medium and fine solid particles, such as grit and sand, together with very fine particles, such as scale or silt. In some cases, the solids produced may include stones, gravel and small rocks, depending upon the operation being performed downhole and the nature of the subterranean formation. Entrained solids leaving the wellhead are responsible for a high rate of equipment erosion and destruction. It is known to provide surface installations with equipment for removing produced solids. Typically, the equipment employed is one or more settling vessels. The nature of solids settling necessarily requires that such vessels are very large in size. It would be advantageous if an effective means of separating produced solids from the fluid phase could be found that did not rely on such large equipment.

Separation installations are installed downstream of the wellhead and operate at pressures significantly below the pressure of the fluid produced at the wellhead. This necessitates employing one or more chokes immediately downstream of the wellhead, in order to reduce the fluid pressure to the operating pressure of the settling equipment. However, choke components are particularly prone to damage from entrained solids. Further, the failure of the wellhead choke represents a major operational problem, in particular if the choke must be replaced, an operation that requires the separation system to be shut down until the repair or replacement can be carried out, resulting in lost production.

Accordingly, there is a need for an effective system and method for separating entrained solids from fluids produced from the well upstream of the wellhead choke, that is at wellhead pressures.

It is known to provide surface installations with desanders. The known desanders comprise a single cyclone insert housed inside a vessel. The desanders of this kind may be employed either upstream or downstream of the wellhead choke and can thus operate at wellhead pressures. While this arrangement represents an improvement over the arrangements discussed above, a number of significant problems remain. First, the known desanders rely upon conventional cyclone technology. The separation efficiency of conventional cyclone separators is at best only moderate, as discussed in more detail below. In particular, conventional cyclone separators generally have a narrow range of operating fluid flowrates. While acceptable in many applications, this represents a major restriction in their suitability for use in subsea installations. It is desirable for a subsea installation to have a wide operational range to handle the daily changes in operating conditions, and also be capable of meeting the well's production profile over an operating lifetime of from 5 to 10 years. During this time, the composition and flowrate of the fluid produced from a given subsea well will vary, sometimes greatly. In is unacceptable to install in such a situation a system that has a narrow window of operation. Accordingly, there is a need for a system that can operate for an extended period of time over a wide range of fluid flowrates and compositions.

Second, the known wellhead separators are designed for the separation of sand, as suggested by their name. However, it is frequently the case that a well will produce a wide range of solid material, much of which is significantly larger in size than sand. A desander, by design, is optimised to separate sand from the produced fluids. However, due to the limitations of conventional cyclone separation techniques, this system will be inefficient in the separation of larger sized or coarser solids, allowing the larger solid particles to pass the separator and enter the downstream equipment, with the results discussed above. Accordingly, there is a need for a separation system that can handle a wide range of solid particle sizes and maintain a high efficiency of separation.

Finally, as soon as fluid is produced from a well, the various phases, including liquid phases and gas, begin to separate. This natural separation of the various phases in the produced fluid stream is advantageous and assists the downstream separation operations. It would be most desirable if a system could be provided that efficiently separates a wide range of solid particles over a wide range of operating pressures and flowrates, but without subjecting the fluid to a high rate of shear causing the already separated phases to mix and emulsify.

US 2004/0217050 discloses a solids separation system for well flowback for use in a subsea wellhead installation. The system uses a hydrocyclone to intermittently separate the heavy phase containing solids from production fluid. The lighter phases are transported to the surface for separation using conventional techniques. The heavy phase collects in the bottom of the hydrocyclone, from where it is periodically removed through a standard choke assembly, to reduce its pressure. The system of US 2004/0217050 does not fully address and resolve the aforementioned issues. Accordingly, there is a need for an improved separation system, suitable for use in a subsea environment, that addresses the aforementioned problems.

SUMMARY

According to a first aspect of the present invention, there is provided a method for separating solids from a multiphase fluid, the fluid comprising a relatively high density component and a relatively low density component, the method comprising:

introducing the fluid into a separation region;
imparting a rotational movement into the multiphase fluid;
forming an outer annular region of rotating fluid of predetermined thickness within the separation region; and
forming and maintaining a core of fluid in an inner region; wherein
fluid entering the separation vessel is directed into the outer annular region; and
the thickness of the outer annular region is such that the high density component and solids are concentrated and substantially contained within this region, the low density component being concentrated in the rotating core.

References herein to a 'multiphase fluid' are to include liquid/liquid mixtures, liquid/gas mixtures. In addition, the term includes mixtures of components that comprise solid materials, provided that the bulk of the mixture is one or more fluid phases. An example of such a multiphase fluid is a slurry or suspension of solid particles and solid material in a liquid and/or gas stream.

References herein to 'downstream' are to a direction extending from the inlet of the multiphase fluid to an outlet through which a solids-rich stream is removed and recovered.

In a conventional cyclone separator, a multiphase fluid is directed into a vessel, where a general circulating or rotating flow pattern is induced. Heavier phases or components, that is those with relatively higher densities, are concentrated in the outer regions of the rotating mass, while the lower density components tend to concentrate in the inner circulating regions. The fluid entering the vessel from the inlet forms a rotating high pressure band from where it may split and follow one of three possible paths, as the incoming fluid meets the fluid already circulating within the vessel. In particular, fluid may leave the main flowpath and pass towards an inner rotational region. Alternatively, fluid may leave the main flowpath and rise upwards, becoming partially trapped. Finally, fluid may leave the main flowpath and move downwards, relative to the major fluid flow. While the general trend within a cyclone is for heavier fluid and material to concentrate in the outer regions of the vessel and for the lighter fluid and components to collect in the central region, the tendency of the fluid to split into various paths causes cross-contamination of the already separate material. This leads to a reduction in the efficiency of the cyclone. The different flow paths will compete for priority, which will be determined by the hydraulic flow parameters of the fluid, that is flow rate, pressure, and relative densities of the different phases or fractions. Accordingly, the design of a cyclone is very dependent upon the particular flow rate and fluid parameters. Operation of a cyclone separator outside these design parameters will reduce the overall separation efficiency and the performance of the separator will fall significantly. As noted above, such a separator is unsuitable for use in situations where a long operational lifetime is required with a wide range of flow rate and hydraulic parameters to be accommodated, such as the separation of solid material from fluids produced from a subsea well.

It has been found that an improved separation of a multiphase fluid can be achieved when the higher density component of the fluid is confined to and caused to rotate in an outer annular region of the separation region, with the inner region or core being maintained and occupied by the lower density component. It is found that the higher density components, in particular solid particles, are concentrated in the rotating outer region, with a good separation of the higher density material occurring from the relatively lower density components, which collect in the inner region. By keeping the higher density components in the rotating outer annular region, they are subjected to maximum rotational forces, which serves to improve the separation. The inner region is separated from the outer annular region by an interface, across which components will migrate. In particular, lighter components will leave the outer annular region and pass into the core region. In contrast, the heavier components, in particular solids, are caused to leave the core region and collect in the outer annular region. In the case of a multiphase fluid comprising components with markedly different densities, in particular liquids and gases, the interface between the inner core region and the outer annular region will form a transition zone.

The method of the present invention is applied in the separation of solid materials from multiphase fluid streams. The method may be applied in the separation of immiscible liquids of different densities. The method may be applied to separate a combined liquid and gas stream into its separate phases. The method of the present invention is particularly suitable in the separation of multiphase fluid streams comprising solid particles, liquid and gas. The method is especially suited to the removal of solid particles from the fluid stream produced from a subterranean well, in particular a well producing oil and gas. The method is also suitable for the separation of such a stream that contains water. In such a case, the method operates to remove the solid particles from the fluid phases and initiate or begin the separation of individual liquid and gas phases.

The method of the present invention is particularly suitable for the separation of solid material from a fluid stream comprising both liquid and gas. This is typically the composition of a stream produced by a subterranean oil or gas well. When the stream contains a significant quantity of gas, the inner region consists almost entirely of gas, the action of which is to prevent liquid and solid components from leaving the outer annular region, resulting in a very high solids removal efficiency. This leads to a further aspect of the present invention, which provides a method for separating solid particles from a multiphase fluid stream, the fluid stream comprising a liquid component and a gas component, the method comprising:

introducing the fluid stream into a separation vessel;
imparting a rotational movement into the fluid;
forming an outer annular region of rotating fluid of predetermined thickness; and
forming and maintaining a core of low density fluid in an inner region; wherein
liquid and solid particles entering the separation vessel are directed to the outer annular region; and
the thickness of the outer annular region is such that the solid particles are concentrated and substantially contained within this region.

The solid material is removed from the rotating annular region by techniques described hereinafter. The outer annular region is maintained with a thickness sufficient to entrap and hold the solid particles.

The thickness of the outer annular region is determined by the overall dimensions and shape of the opening or inlet through which the fluid is caused to enter the separation region. In particular, the thickness of the outer annular region is dependant upon the height and width of the inlet. The angle of the inlet determines the angle at which the fluid stream enters the separation region, in turn determining the pitch of the helical flow path followed by the fluid stream in this region. In this respect, references to an angle are to the angle with the longitudinal axis of the separation region. These are selected to cause the fluid to enter and form the outer annular region. As the dimensions of the inlet are fixed, the volumetric flowrate of the fluid feed stream entering through the inlet determines the velocity of the fluid stream and in turn determines the initial rotational velocity of the fluid in the outer annular region.

Preferably, the inlet is arranged to introduce the fluid stream some distance from the upstream end of the separation region. In this way, a space is left between the upstream boundary of the outer annular region and the end of the vessel containing the separation region. This allows any high density fluid that splashes from the outer annular region can return, typically by gravity, to the rotating fluid stream and be entrapped. In this way, erosion of the end wall of the vessel containing the separation region by high density fluids and entrained solids is minimised.

As noted above, it is frequently the case that subsea wells produce a significant quantity of solid formation material, together with the various fluid phases. The solid formation materials include coarse, medium and fine solid particles, such as grit and sand, together with very fine particles, such as scale or silt. In some cases, the solids produced may include stones, gravel and small rocks, depending upon the operation being performed downhole and the nature of the subterranean formation. The method of the present invention is effective in removing solid material, such as grit, sand and the like in all size ranges, from the production fluid. However, the separation efficiency of the method is such that it will also operate to remove larger solid particles that may be produced by a well. Such particles include well debris, for example metal particles, resulting from drilling or finishing operations, as well as debris resulting from equipment damage or failure. In the case of failure of downhole equipment, substantial solid particles, typically metal particles, may be produced with the well fluid. It will be appreciated that such debris can cause significant damage to downstream equipment, such as chokes and the like, if not removed.

Solid particles removed from fluid streams by the method of the present invention may range from a few millimeters in diameter to several centimeters. Sand and gravel particles range from 1 mm to from 5 to 10 mm. Larger debris may include objects in the range of from 1 to 5 cm or larger. It is an advantage of the method of the present invention that such a large range of solid particles may be separated from the fluid stream.

A particular advantage of the method of present invention is that it can be operated over a wide range of flowrates, that is has a large turn-down ratio. The method may be applied in a single separation apparatus and operate at flowrates in the range of up to 25,000 barrels per day (BPD), in particular from zero, more particularly from 5,000 up to 25,000 BPD. That is, the method may be operated with flowrate fluctuations as great as 500%, without significant reductions in the separation performance of the system. The method preferably operates at flowrates of up to 25,000 BPD. Higher flowrates are possible, for example of from 1,000 to 100,000 BPD, with the separation apparatus being sized accordingly. However, the performance of the method in removing the smaller solid particles may be reduced. Preferred operating flowrates are in the range of from 2,000 to 25,000 BPD, with flowrates down to zero being operable. At lower flowrates, the separation of the components may occur as a result of gravity separation effects as the dominate separation mechanism. At higher flowrates, the dominant separation mechanism will be due to rotational movement of the fluid components.

The single separation apparatus can be sized for volume throughput, in order to cater for a particular fluid flowrate. Alternatively, the apparatus may be sized according to a desired quality of separation. Therefore, to achieve both a desired separation performance and a range of fluid volumetric flowrates, a plurality of apparatus of different sizes may be applied. In this way, units of different sizes may be operated in different combinations, by means of a suitable selective flow-switching means, to accommodate a range of flowrates and separation duties.

In order to impart the rotational flow pattern to the stream and create the rotating annular region, it is preferred to use a tangential entry of the fluid stream into the separation region. Such techniques are known in the art of cyclone separation. However, in order to ensure that the annular region is of sufficient depth and possesses a regular flow pattern, it is preferred that the tangential entry is at an acute angle to the longitudinal axis of the separation region. In this way, the fluid stream entering the region is caused to rotate around the inner wall of the region and not collide with the incoming stream. The overall effect is to create a helical flow pattern within the rotating annular region, with the components in this region rotating around the central core of low density components. The angle at which the fluid is introduced into the vessel is preferably selected so that the fluid rotates in a helical path that allows the fluid after one revolution to clear the inlet jet and not impact with the incoming fluid. Typically, the angle is in the range of from 45° to 85°, more preferably from 60° to 85°, to the longitudinal axis of the separation region. The dimensions of the inlet are selected according to the general specification of the well fluid and the fluid retention time required in the outer annular region in order to allow the solids to migrate to the outer wall of the vessel.

In one preferred arrangement, the portion of the separation region adjacent the fluid inlet is provided with a guide surface, such as in a wall assembly, shaped to induce the incoming fluid stream into a spiral or helical flow pattern. This wall assembly may be disposed between the inlet and the upstream end of the separation region, in order to prevent fluid entering the separation region from flowing towards the upstream end. The wall assembly preferably has a form that induces a helical flow pattern in the incoming fluid stream, such that fluid that has entered the separation region is caused to move in a generally downstream direction sufficient so that the fluid completing its first rotation within the separation region is not contacted by the incoming fluid stream. The wall assembly is preferably provided with one or more helically extending surfaces, the surfaces extending generally in the same helical pattern as the desired helical flow pattern to be induced in the incoming fluid stream. A suitable wall assembly is known in the art and is disclosed in GB 2,353,236.

It has been found that the use of a guide having one or more helically extending guide surfaces as hereinbefore described allows the angle of the inlet conduit be oriented closer to the perpendicular to the longitudinal axis of the separation region.

The inlet for the fluid may be any suitable shape. Circular inlets are well known and may be used in the method of the present invention. However, preference is given to inlets having a rectangular cross-section and opening for the incoming fluid stream. The rectangular inlet helps to generate a uniform helical flow pattern in the outer annular region. In addition, the rectangular inlet provides a better interface between the incoming fluid and the inner wall of the separation region, resulting in a more stable flow regime in the outer annular region.

The rectangular inlet preferably has its longest side parallel to the longitudinal axis of the separation region. The height of the rectangular opening of the inlet, that is the dimension in the direction parallel to the longitudinal axis of the separation region, in combination with the angle of the inlet determines the pitch of the helical flow pattern within the outer annular region. The width of the rectangular opening of the inlet, that is the dimension perpendicular to the longitudinal axis of the separation region, will determine the thickness of the outer annular region.

As the fluid stream moves helically within the outer annular region (typically downwards within a generally vertically arranged separation vessel), the solid particles will collect at the wall of the separation region in the outermost portion of the annular region. The fluid phases, being less dense than the solids, will migrate to the innermost portion of the annular region, in which portion the fluid phases will separate into the more dense phase, which will remain in the annular region, and the less dense phase, which will migrate into the central core. This effect is particularly marked when the fluid stream contains a gaseous phase, in which case the gas quickly leaves the rotating fluid in the outer annular region.

As the fluid stream in the outer annular region progresses, it will lose momentum, the effect of which is to cause the outer annular region to become thicker. As the flowpath of the fluid stream is followed, the annular region increases in thickness, until it reaches the centre of the separation vessel. This effect causes the interface of the least dense fluid of the inner core and the denser fluid retained in the outer annular region to adopt a convex profile in the downstream direction. The precise form of this profile and the overall form of the interface between fluids in the core and fluids in the outer annular region will depend upon such factors as the density of the fluid stream and the inlet velocity of the stream as it enters the separation vessel. It will thus be appreciated that the profile of the interface and the overall shape and dimensions of the core region will vary as the parameters of the fluid stream change, such as will happen over time for a fluid stream produced by a subterranean well. As noted above, it is a significant advantage of the method of the present invention that changes in the shape and dimensions of the core region, and hence the properties of the inlet stream, can be readily accommodated without any change in the separation apparatus being required.

Conventional cyclone separators are provided with an outlet for fluid to leave the separation vessel. The outlet is typically arranged coaxially within the vessel as an exit or dip pipe, through which fluid may leave from the central most region of the vessel. However, such an arrangement cannot be applied in the case of the present invention. In particular, it is not possible to remove fluid directly from the core region in this way, as this region must be allowed to form and be maintained. Rather, it is necessary that fluid removal from the core region is carried out in a controlled manner so as to maintain the core region intact. A number of alternative designs of fluid removal may be employed, as follows.

In a first embodiment, a fluid collection region is provided downstream of the core region, having a fluid outlet. Some fluid will leave the core region by means of displacement. However, by appropriate design of the fluid outlet, it is possible to establish a steady-state condition under which the core region is maintained and fluid from the core region is caused to exit via the outlet opening downstream of the core region itself. With such an arrangement, the fluid exiting through the outlet will be a mixture of the high density fluid and the low density fluid. This combined fluid stream may be passed to a further separation process in order to separate the various fluid phases. An example of such a separation process is a gas/liquid separator.

Alternatively, a low density fluid collection region, having a fluid outlet, is provided at or in the region of the downstream end of the core region, through which fluid, that is predominantly low density fluid, is removed from the process. With such an arrangement, the fluid leaving the core region consists mostly of the low density fluid, perhaps with some entrained high density fluid and even a minor amount of entrained small solid particles. As this fluid stream has the low density fluid in a high concentration, it is preferably kept separate from other fluid streams removed from the process. This stream may be subjected to a further separation in which entrained high density liquids and entrained solids are removed.

In embodiments having a low density fluid collection region, a high density fluid collection region, having a second fluid outlet, is provided downstream of the core region for the removal of high density liquid. With such an arrangement, the fluid stream leaving through the second fluid outlet comprises as a major portion high density fluid, with some entrained low density fluid and/or solids. As this fluid stream has the high density fluid in a high concentration, it is preferably kept separate from other fluid streams removed from the process. This stream may be subjected to a further separation in which entrained high density liquids and entrained solids are removed.

In one embodiment, the solids and/or liquids separated from the fluid streams leaving the first and/or second fluid outlets are recycled to the separation region for further processing.

The or each fluid outlet may be in the form of a conventional pipe or tubular opening located centrally within the separation region. However, such openings when present in a concave rotating fluid stream tend to generate a region of low pressure, the effect of which can be to disturb the separation of solids and fluids already established in the annular region. The or each fluid outlet is conveniently formed as an outlet pipe, having a closed end and with fluid outlet apertures formed along its length extending within the fluid collecting region. However, in such a case, it is preferred that the combined area of the fluid outlet apertures is greater than the cross-sectional area of the outlet pipe. In order to achieve a gradually distributed fluid take-off, the apertures are arranged over a length of the exit pipe. In addition, to reduce turbulence in the fluid collecting region, the apertures are preferably arranged tangentially to the rotational flow of fluid in the collecting region. This aids in reducing the shear applied to the fluid, which assists in maintaining the separation of fluid phases already achieved in the preceding regions. This addresses a problem with known separators, the collectors of which can cause the phases to redisperse or, in particular inefficient systems, result in the phases emulsifying.

In embodiments having both a low density collecting region and a high density collecting region, and therefore first and second fluid outlets, one arrangement is to provide the outlets as openings in the same conduit. The conduit may be arranged coaxially within the separation region. The openings are preferably formed as hereinbefore described. In such an arrangement, the conduit extends from within both the low density fluid collection region and the high density fluid collection region. The conduit may have a single outlet, resulting in the fluid streams collected from the two collection regions being mixed. Preferably, the conduit is provided with a low density fluid outlet and a high density fluid outlet, thus maintaining the fluid separation already achieved within the process.

In a preferred arrangement, a separate conduit is provided for collection and transport of fluid from each of the low density collecting region and the high density collecting region. Each conduit extends into its respective region and is provided with one or more openings for the collection of fluid. The openings may be formed as hereinbefore described.

It is preferred to provide the conduit leading from the low density fluid collecting region with a dip pipe or the like, in order to maintain the appropriate fluid level within the assembly. Similarly, it is preferred to provide the conduit leading from the high density fluid collecting region with a stand pipe, again to maintain a fluid level within the assembly.

Downstream of the fluid collecting region or regions, the flowrate of the remaining fluid stream will be significantly lower. The stream at this point contains a high proportion of solid particles entrained in fluid, predominantly high density fluid, with a minor portion of low density fluid entrained therein. In order to prevent fluid vortices extending into the regions downstream of the fluid collecting region, it is preferred to provide a means for controlling any vortices that may form, such as a vortex breaker.

Downstream of the vortex breaker the stream is rich in solids and typically is in the form of a solid slurry, in which solid particles are suspended and entrained in the remaining fluid. Typically, this fluid will be rich in the denser of the fluid phases entering the separation vessel. It is an advantage of the method of the present invention that further separation of components from the stream may still be achieved. The remaining fluid can become more concentrated in the solid particles by providing a solid concentrating region, in which the cross-sectional area of the fluid flowpath decreases in the direction of flow. The reduction in cross-sectional area of the fluid flowpath may be achieved by providing a generally cylindrical vessel section with a central, longitudinally arranged cone. Alternatively, the vessel may be conical in form.

It is important that the fluid stream in the solid concentrating region is rotating, in order to prevent the solid particles in the fluid stream from settling out and forming a solid mass in the downstream region of the solid concentrating region. Such settling out renders the collected solids difficult to remove. However, it is also important that the flow stream is not rotating too fast, as this can reduce the efficiency of the solid concentrating region and require high volumes of fluid to be removed in order to effect sufficient solids removal from the apparatus. In order to reduce the helical or rotational flow pattern of the fluid in the solid concentrating region, the region may be provided with one or more baffles of appropriate shape and size to generate the optimum fluid flow pattern.

Preferably, the method of the present invention provides a final solids separation and removal region, the function of which is to separate the larger solid particles, such as well debris, from the smaller solid particles, such as sand and grit. In one embodiment, the smaller solid particles are removed in the form of a slurry from the central region of the separation and removal region. This is conveniently achieved by means of an outlet pipe extending into the separation and removal region and provided with a plurality of slurry outlet apertures. To minimise the change in direction of the fluid, the apertures are preferably arranged tangentially to the rotating fluid flow. Larger solid particles remain in the outer region of the separation and removal region and may be removed through one or more outlets. These outlets may conveniently be one or more ports in the wall of the separation vessel. Again, to be in line with the fluid flow direction and minimise the risk of blockages occurring, the outlets are preferably oriented tangentially to the rotating fluid flow.

In an alternative embodiment, the solids separation and removal region is provided with an inner conduit having a plurality of slurry outlet apertures forming a solids sieve. The fluid stream is caused to flow through the inner conduit. The rotation of the fluid stream causes the solid particles to collect at the wall of the inner conduit, with the smaller solid particles passing outwards through the solids sieve. Larger solid particles, such as well debris, remain within the conduit and are collected at the outlet of the conduit. The size distribution between solid particles retained within the inner conduit and those leaving through the sieve is determined by the diameter of the apertures in the solids sieve.

The removal of the large diameter solid particles may be on a continuous basis, or operated batch-wise, as the need arises. This will depend, in part, upon the relative amounts of solid and fluid components present in the feed stream, as well as the particle size distribution of the solid material.

The streams containing solid particles, both large and small, may be passed to a further separation process, for further concentration and removal of the solids material. Fluid components removed during these separation processes may be recycled to the appropriate position in the separation region.

In a further aspect, the present invention provides a separation system for a multiphase fluid containing a high density component and a low density component comprising a separator having:

a separation region;

an inlet for the multiphase fluid to enter the separation region;

means for imparting a rotational movement to the multiphase fluid upon entry into the separation region, so as to form an outer annular region of rotating fluid of predetermined thickness and a core region;

in operation the thickness of the outer annular region being such that the high density component is concentrated and substantially contained within the outer annular region; and the low density component is concentrated in the core region.

The separation system comprises a separation region. This is most conveniently arranged as a generally cylindrical vessel. With the vessel disposed substantially vertically, the inlet for the multiphase fluid is arranged in the upper portion of the vessel.

The system may comprise a single inlet for the multiphase fluid to enter the separation region and a single inlet will suffice in many applications. However, if required, two or more fluid inlets may be provided, for example disposed around the separation region to form a fluid inlet region.

The system comprises a means for imparting a rotational motion to the multiphase fluid entering the separation region. The rotation is most conveniently, and most preferably, by appropriate design of the fluid inlet. In particular, the rotational movement can be achieved by arranging the fluid inlet at a tangent to the separation region. The inlet is preferably arranged at an acute angle to the longitudinal axis of the separation region. In this way, the inlet imparts a helical flow pattern to the fluid entering the system, thereby establishing the annular region of fluid along a portion of the length of the separation region. The inlet may be at an angle of from 45° to 85°, more preferably from 50° to 80°, to the longitudinal axis of the separation region. The inlet may have any suitable cross-sectional shape. However, preference is given to an inlet having a rectangular cross-section. In this way, a smoother transition of the fluid flow from the inlet to the wall of the separation region will be achieved. The dimensions of the inlet are selected to provide the flow pattern required in the outer annular region of the separation region.

The separator system further comprises an arrangement of fluid outlets for removing fluid from various points in the separation process. One of a number of alternative arrangements for the fluid outlet may be employed. In the first arrangement, both low density fluid and high density fluid is removed through the same outlet. This arrangement has the advantage of being simple. However, this arrangement tends to negate the effects of the process in separating the fluid phases. An alternative arrangement is to provide two separate fluid outlets, placed within the separation region so as to selectively remove high density fluid and low density fluid from their respective regions of highest concentration. In this way, the fluid separation achieved by the process may be retained. Details of the alternative arrangements for the fluid outlet are described below.

In a first preferred embodiment, the system comprises a fluid outlet disposed within the separation region at a position that, in use, corresponds to a position downstream of the end of the core region. The outlet is preferably formed in a conduit extending into the separation region. The outlet may simply be the open end of the conduit. However, this has been found to generate turbulence and shear in fluid flowing past the opening, the tendency of which is to mix fluid phases that have already begun to separate. Accordingly, the outlet is preferably in the form of a conduit having a closed end and provided with a plurality of openings in its end portion. With the conduit arranged longitudinally and centrally within the separation region, the openings extend radially outwards. In a preferred arrangement, the openings are arranged tangentially to the flow of fluid occurring around the conduit during use. In this way, an enhanced fluid flow profile is created in the fluid flow pattern.

In an alternative arrangement, a first fluid outlet for low density fluid is provided within the separation region at a position corresponding to the region at the downstream end of the core region. In this way, low density fluid that has collected within the core region is removed in a stream that contains the low density fluid in a relatively high concentration. The first fluid outlet is preferably formed in a conduit extending into the separation region, the details of which are as described above.

Preferably, in the case of a first fluid outlet disposed within the core region, a second fluid outlet is provided within the separation region at a position corresponding to a position downstream of the core region, when the system is in use. In this way, fluid may be removed directly from the region having the high density fluid in a high concentration. The second fluid outlet is preferably formed in a conduit extending into the separation region, the details of which are as described above.

One arrangement comprises a single conduit extending within the separation region and having openings disposed to provide the first fluid outlet and the second fluid outlet. The conduit may have a single outlet for the fluid collected from the separation region. However, most preferably, the conduit has an outlet for each of the low density fluid and the high density fluid. In this way, the separation of the fluid phases achieved within the separation region is maintained.

In a preferred arrangement, each of the first fluid outlet and the second fluid outlet open into a separate conduit, for collection, transport and removal of the respective fluid fraction from the assembly. In this way, each fluid fraction may be lead away from the assembly. The conduit for the light fluid fraction preferably comprises a dip pipe or the like, in order to maintain an appropriate fluid level. Similarly, the conduit for the heavier fluid fraction may comprise a stand pipe.

In the region downstream of the core region and the fluid outlet or outlets, the system preferably comprises a means for breaking and/or controlling vortices forming within the separation region.

Thereafter, in the downstream direction, the system preferably comprises a region having the function of concentrating the most dense phases in the stream being processed. This feature is particularly advantageous when the fluid stream being separated contains solid particles of varying sizes. The concentration region is provided by having the cross-sectional area of the separation region reduced. This may be achieved by providing the separator vessel with a conical or tapered internal wall.

Alternatively, the necessary reduction in cross-sectional area may be achieved within a vessel of constant cross-section by provision of a conical or tapered element disposed within the separation region. If employed, the conical or tapered element preferably comprises one or more longitudinal bores or passages therethrough, in order to allow lower density fluid to vent from the region below the element to the region above the element. The conical or tapered element will extend at the angle required to give the appropriate change in cross-sectional area of the separator, in the direction of fluid flow. A typical angle of cone or taper is in the range of from 5 to 30° to the longitudinal axis of the separator.

For the processing and separation of solid particles from the multiphase fluid stream, the system is preferably provided with a region for separating solid particles from the fluid in the downstream portion of the separation region. In a first embodiment, the solid separator comprises a conduit extending coaxially within the separation region having a plurality of openings in the wall of the conduit. The openings preferably extend radially through the wall of the conduit, most preferably at a tangent to the surrounding fluid flow. In this way, fluid and smaller solid particles entrained in the fluid are caused to pass through the openings into the conduit, from where the fluid and solids may be recovered. The size of the openings may be selected to provide the particle size distribution desired in the separated solids. In this way, the conduit acts as a form of filter, retaining the larger particles within the separation region, from where they may be recovered through a suitable outlet disposed in the wall of the separator region.

In an alternative arrangement, the wall of the separation region is provided with a plurality of openings of appropriate size, the openings connecting the separation region with a solid entrapment zone disposed around the separation region. In a preferred arrangement, the solid entrapment zone is an annular region extending around the separation zone and separated by the perforated wall of the separation zone. Under the action of the rotating fluid, smaller particles will pass through the openings entrained in fluid, while larger solid particles will be retained within the separation region. Again, the size of the openings may be selected to provide the desired particle size distribution between the separated solids and act as a filter. The smaller particles and fluid are removed from the solid entrapment zone through a suitable outlet. Larger particles may be removed from the separation region, again through a suitable outlet.

The removal of large solid particles from the separation region may be operated on a continuous basis. However, it may be preferable in some situations to remove the larger solids intermittently or batchwise. This may be particularly useful when processing a fluid stream produced from a subsea well, in which may be entrained not only smaller solid particles, such as sand and grit, but larger debris from damaged or worn downhole equipment and the like. The larger debris may be allowed to accumulate in the downstream end of the separation region and removed at regular intervals, for example by means of a remotely operated vehicle (ROV).

A particular problem arises with existing arrangements of subsea processing assemblies. At the present time, it is the practice to install subsea separation assemblies to operate at reduced pressures. Examples of such assemblies are settling tanks and the like. This arrangement necessitates installing the separation units downstream of process equipment such as chokes. A particular problem arises when the fluid being produced from the well contains solid material, such as sand and well debris. The process equipment located upstream of separator units is exposed to the flow of the fluids and entrained solids at substantially wellbore pressure. This results in a very rapid rate of wear of the process equipment and frequent failures. Given the position of such equipment in the process relative to the wellhead, it is an expensive and time consuming task to repair or replace broken or failed items. It is known to provide desanders immediately downstream of the wellhead, in order to remove sand from the produced fluids. Such desanders are cyclone separators, effective in removing sand particles of a particle grade. However, such equipment is not effective in the removal of larger solid particles or debris, which can be carried over and find their way into the downstream processing equipment causing the damage mentioned before. Such debris may arise as a result of a failure or breakage of downhole equipment, resulting in large items of debris being produced from the well. It is an advantage of the method and system of the present invention that this debris can be effectively removed. Accordingly, the system of the present invention is particularly suited to being situated immediately downstream of the wellhead, being able to operate as it does at wellhead pressures and remove or contain even the largest of debris produced by the well.

Accordingly, in a further aspect, the present invention provides a subsea processing assembly comprising:
  a wellhead assembly through which fluids are produced from a subterranean well;
  a separator assembly having a fluid inlet connected to the wellhead assembly for receiving the fluids produced from the well, the separator assembly being operable at wellhead pressure to remove well debris entrained in the fluids to produce a solids-rich phase and a fluid phase, the separator assembly comprising a fluid outlet for the fluid phase; and
  a choke assembly having an inlet connected to the fluid outlet of the separator assembly.

The separator assembly may be connected directly to the wellhead assembly or by means of a pipeline.

Similarly, the separation assembly of the present invention may be employed on an offshore platform receiving production fluids directly from either platform wellheads or a subsea wellhead through a riser or the like upstream of the choke. Accordingly, in a further aspect, the present invention provides a platform processing assembly comprising:
  a fluid receiving assembly for receiving fluids produced from a subterranean well;
  a separator assembly having a fluid inlet connected to the fluid receiving assembly for receiving the fluids produced from the well, the separator assembly being operable at wellhead pressure to remove well debris entrained in the fluids to produce a solids rich phase and a fluid phase, the separator assembly comprising a fluid outlet for the fluid phase; and
  a choke assembly having an inlet connected to the fluid outlet of the separator assembly.

In this respect, the wellhead pressure at the fluid receiving assembly of the platform will be the actual wellhead pressure less any pressure drop due to the change in elevation or as a result of the passage of the fluid through the riser assembly.

As noted above, the method of the present invention is particularly suitable for the separation of solid particles from a multiphase fluid stream containing gas and liquids. Accordingly, in a further aspect, the present invention provides a method for separating solid particles from a multiphase fluid stream, the fluid stream comprising a liquid component and a gas component, the method comprising:
  introducing the stream into a separation region;
  imparting a rotational movement into the fluid;
  forming an outer annular region of rotating fluid of predetermined thickness; and
  forming and maintaining a core of gas in an inner region;
    wherein liquid and solid particles entering the separation vessel are directed to the outer annular region; and the thickness of the outer annular region is such that the solid particles are concentrated and substantially contained within this region.

As has been hereinbefore described, a multiphase fluid stream is introduced into a separation in such a way as to impart a helical, rotational flow pattern and to cause an outer annular region of heavier components to form. Conventionally, equipment that relies upon the separation of components using fluid rotation and the resultant forces has introduced the combined stream into a suitable vessel or region through one or more openings. In the development of the present invention, it has been found that this incoming stream can disrupt the flow patterns established within the separation region. It has been found that this disruption can be reduced, and the separation efficiency increased, by forcing the incoming fluid to flow along a circular or helical path prior to entering the separation region. In this way, the components within the fluid stream may be at least partially oriented in a corresponding manner to the orientation required in the separation region.

Accordingly, in a further aspect, the present invention provides a method of separating a multiphase fluid stream, the method comprising introducing the stream into a separation region in a manner to induce a rotational flow pattern within the separation region, wherein, prior to its introduction into the separation region, the fluid stream is caused to flow along an arcuate flowpath, the fluid flowing along the arcuate flowpath in an orientation corresponding to the rotational flow pattern within the separation region.

It has been found that under the appropriate flow regimes within the arcuate flowpath, the components within the fluid stream can be caused to separate according to their relative densities. This initial separation may be used to enhance the separation required in the separation region, provided the fluid inlet is oriented to introduce the fluid stream into the separation region such that the components of the incoming fluid are appropriately oriented. Thus, the arcuate flowpath and the fluid inlet are arranged such that the heavier components in the fluid stream are introduced radially outwards of the lighter components.

The arcuate flowpath may be circular or helical, as required by the particular separation function to be achieved and the physical aspects of the assembly being used.

The flow of fluid in the circular flowpath should be in a regime that allows for separation of the components to begin. Accordingly, it is preferred that the fluid stream in the arcuate flowpath is in a laminar or transitional flow regime, that is less than turbulent. The length and radius of curvature of the arcuate flowpath should be sufficient to at least initialise separation of the heavier and lighter fractions prior to the stream entering the separation region.

In a further aspect, the present invention provides an apparatus for separating a multiphase fluid stream, the apparatus comprising:

a separation region;

an inlet for introducing a fluid stream into the separation region;

an arcuate conduit for conveying a fluid stream to the inlet;

wherein the arcuate conduit and the inlet are arranged to introduce the fluid stream into the separation region in an orientation corresponding to that of the fluid within the separation region during operation.

The separation region may be that of any known or conventional rotational separation device, such as a cyclone. In this respect, an existing separation installation or assembly may be modified to operate according to this aspect of the invention by a suitable modification of the conduit conveying fluid to the inlet of the separation device.

BRIEF DESCRIPTION OF THE DRAWINGS

Embodiments of the present invention will now be described, by way of example only, having reference to the accompanying drawings, in which.

DETAILED DESCRIPTION OF THE EMBODIMENTS

References to 'upwards' and 'downwards' as used herein refer to the assemblies with longitudinal axes in the vertical orientation as shown in the accompanying figures. It will however be understood that non-vertical orientations may also be applied and the aforementioned terms are to be construed accordingly.

Figure 1B:
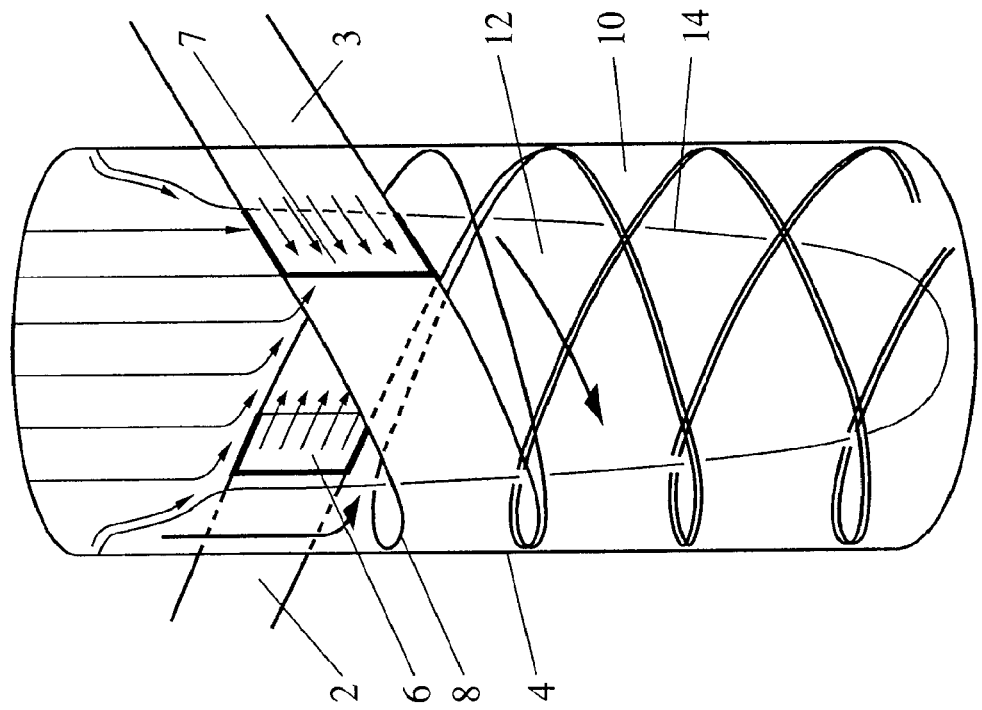
FIG. 1B is a schematic representation of alternative flow patterns of the components of a multiphase fluid stream in the method of the present invention.
Figure 1A:
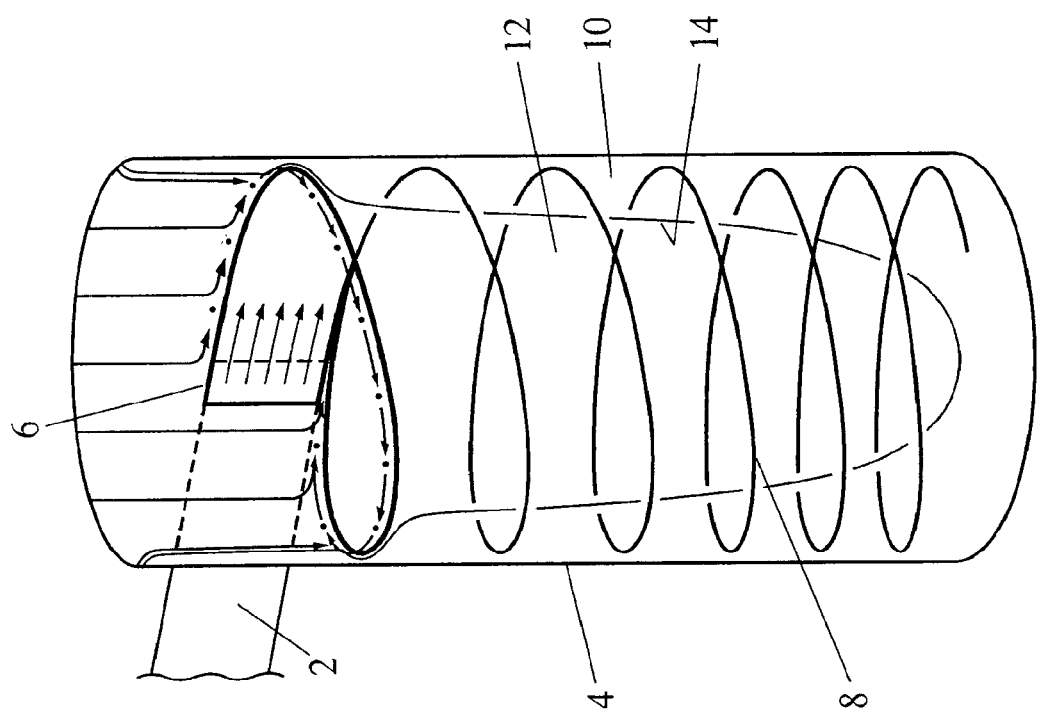
FIG. 1A is a schematic representation of the flow patterns of the components of a multiphase fluid stream in the method of the present invention.

Referring to FIG. 1A, there is shown a schematic representation of a typical fluid flow pattern within the separation region of the method of the present invention. A multiphase fluid 2 is introduced into a vertically oriented separation region 4 through a single rectangular tangential inlet 6. The inlet 6 is at an angle to the longitudinal axis of the separation region 4, such that the incoming fluid 2 is directed against the wall of the separation region in a helically descending flow pattern 8. The general direction of fluid flow is indicated by the arrow in FIG. 1. The helical flow pattern establishes an outer annular region 10 adjacent the wall of the separation region 4 within which is disposed a core region 12. The components of the multiphase fluid having a higher density are concentrated in the outer annular region 10, while the lower density components migrate to and are collected in the core region 12. An interface 14 is established between the core region and the outer annular region. For example, when the multiphase fluid comprises solids, liquids and gases, the outer annular region 10 is essentially a rotating wall of liquid, with entrained solids and some entrained gas bubbles. In contrast, the core region 12 is composed of gas, with some entrained liquid droplets. A rapid exchange of liquid and gas will occur across the interface 14 between the core region and the annular region, as the fluid descends within the separation zone. As will be seen from FIG. 1, the interface 14 is convex in shape in the downstream direction of flow.

As shown in FIG. 1A, the helical flow pattern followed by the incoming fluid has a pitch such that the fluid completing its first revolution passes below the incoming fluid entering through the inlet 6. In this way, the incoming fluid avoids colliding with the rotating fluid already within the separation region 4. This serves to quickly and efficiently establish the outer annular region at the thickness predetermined by the dimensions of the inlet 6.

As also shown in FIG. 1A, the inlet 6 is disposed some distance from the upper end of the separation region 4. In this way, high density fluid and entrained solids splashing from the outer annular region 10 are caused to drop back into the fluid stream and become entrained in the fluid circulating in the outer annular region 10. In this way, the erosion of the top of the vessel wall containing the separation region 4 is minimised.

FIG. 1B shows a similar representation of fluid flow patterns to that of FIG. 1A. Features of FIG. 1B shared with FIG. 1A are indicated using the same reference numerals. In FIG. 1B, the multiphase fluid is divided into two streams 2 and 3 and is caused to enter the separation region 4 through two opposed rectangular inlets 6 and 7. Each inlet 6 and 7 is arranged tangentially to the wall of the separation region 4. The inlets 6 and 7 are angled such that the incoming fluid from the inlet 7 flows below and under the fluid stream 2 entering through the inlet 6, in order to avoid collision between the fluid streams 2 and 3. It will be appreciated that three or more inlets may be arranged, applying a similar approach to that of FIG. 1B, such that multiple fluid streams are introduced into the separation region 4 with minimal or no collision between the incoming fluid streams.

Figure 2:
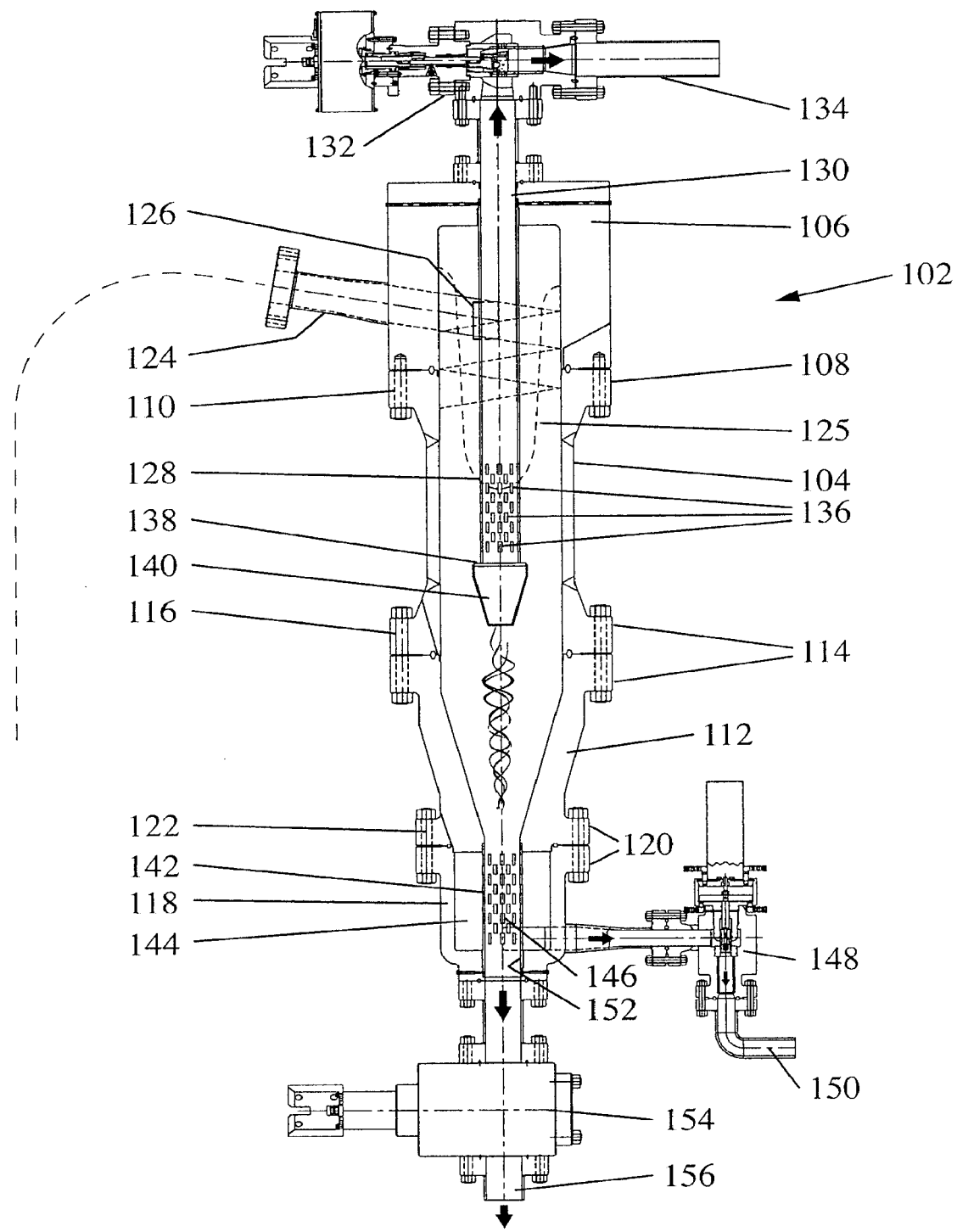
FIG. 2 is a longitudinal cross-sectional view through a separator system according to a first embodiment of the present invention.

Referring to FIG. 2, there is shown, in vertical cross-section, a separator system according to one embodiment of the present invention. The separator system, generally indicated as 102, comprises a generally cylindrical, vertically oriented separator 104, having a cap 106 mounted on the upper end of the separator by means of a flange 108 and bolts 110. A tapered solid concentrator 112 is secured to the lower end of the separator 104 by means of flanges 114 and bolts 116. As shown in FIG. 2, the solid concentrator 112 has a conical inner portion. The angle of the conical section will be determined by the properties of the fluid being processed. Cone angles in the range of from 5 to 20° from the longitudinal axis of the separator are typical for the separation of a fluid stream comprising crude oil, water and solids.

The separator 104 has a generally cylindrical bore running therethrough, extending in its upper portion into the cap 106 and, in its lower portion, partially into the solid concentrator 112. The remaining portion of the solid concentrator 112 is formed with a tapered bore, decreasing in cross-sectional area in the downwards direction and opening into a slurry container 118 mounted to the lower end of the solid concentrator 112 by means of flanges 120 and bolts 122. The combined bores of the cap 106, separator 104, solid concentrator 112 and slurry container 118 form a separation region. The components forming the separation region are of sufficiently wear resistant material to avoid excessive erosion of the walls or may be lined or sleeved in such material.

The cap 106 is provided with a feed pipe 124 communicating with a rectangular inlet 126 in the cap. The feed pipe 124 and the rectangular inlet 126 are arranged at an acute angle to the longitudinal axis of the separator and tangentially to the wall of the cap 106. The angle of the feed pipe 124 and the inlet 126 will be determined by the properties of the fluid stream and the separation duty to be performed. A typical angle for the feed pipe 124 and inlet 126 is from 5 to 20°, measured from a line perpendicular to the longitudinal axis of the separator 104.

The dimensions of the inlet opening will also be determined by the fluid stream and the separation duty. For a fluid stream comprising a viscous crude oil, water and sand particles, the inlet 126 will be sized to provide a fluid inlet velocity of from 1 to 5 m/s. The relative dimensions of the inlet opening, that is its aspect ratio, are determined by the fluid properties and the separation and the required flow pattern within the separator 106. In particular, the aspect ratio of the inlet 126 will affect the thickness of the outer annular region, in which the heavier components will concentrate.

A fluid outlet pipe 128 extends co-axially from the closed end of the cap 106 down into the solid concentrator 112. At its upper end, the fluid outlet pipe 128 communicates with an outlet 130 in the cap 106, to which is connected to the inlet of a production fluid choke 132 of conventional design, for example a plug-and-cage choke. The outlet of the production fluid choke 132 is connected to a fluid line 134 leading to downstream fluid processing equipment. The lower end of the fluid outlet pipe 128 coincides generally with the junction between the separator 104 and the solid concentrator 112 and is closed. The lower end portion of the fluid outlet pipe 128 comprises a plurality of fluid ports 136 extending in a radially outwards direction at a tangent to the outer surface of the fluid outlet pipe 128.

A vortex control assembly 138 is provided and mounted on the lower end of the fluid outlet pipe 128, and comprises a fluid guide 140 in the form of an inverted cone to provide a vortex flow foil. The fluid guide 140 acts to disseminate the upwards flowing vortex. This induces a curved flow path allowing fluid to circulate and enter the tangential ports 136 without fluid suction arising. The fluid guide 140 also forces the heavier components outwards, thus preventing a premature widening of the outer annular region and pushing the interface 125 radially outwards. This further enhances separation of the components of the fluid stream.

The slurry container 118 comprises a generally cylindrical bore of larger internal diameter than the diameter of the lower end of the tapered bore in the solid concentrator 112. A perforated cage 142 having an internal diameter corresponding to that of the lower end of the tapered bore in the solid concentrator extends co-axially through the slurry container 118 and forms an annular region 144 in the slurry container. The perforations 146 in the cage 142 are arranged tangentially and connect the bore of the cage 142 with the annular region 144. A tangentially arranged fluid outlet is provided in the lower portion of the annular region 144 of the slurry container 118 and connected to the inlet of a slurry choke 148 of conventional design, for example a stem-and-orifice choke. The outlet of the slurry choke 148 is connected to a slurry line 150 leading to the downstream slurry processing equipment.

The perforated cage 142 is connected at its lower end to an outlet 152 in the slurry container 118, which is in turn connected by a hydraulic or manual ROV valve 154 to a debris line 156, through which debris collected in the system may be collected and removed.

In operation, a multiphase fluid stream comprising gas, one or more liquid phases, and solid particles ranging from sand to well debris is fed through the feed pipe 124 to the rectangular inlet 126 in the cap 106. Such a multiphase fluid is typical of the stream produced from a subterranean well. The fluid stream enters the separation region in the cap 106 and flows in a helical pattern downwards within the cap 106 and separator. The liquid and solid phases present in the fluid stream are substantially confined to flow in an annular region adjacent the wall of the cap 106 and separator. A core region consisting essentially of gas is maintained within the separation region, the interface between the core region and the annular region being shown by the dotted line 125 in FIG. 2. As rotating liquid stream descends within the separator 104, entrained gas is caused to pass into the gas core. Liquid droplets and any solid particles that may be entrained within the gas core are caused to move in the opposite direction and enter the liquid annular region.

As the liquid stream in the annular region descends, it loses angular momentum, resulting in the annular region becoming larger in cross-section as the separator 104 is descended and the core region smaller in cross-section, until the liquid in the annular region extends across the bore of the separator. This action forms the convex shape of the interface shown in FIG. 2 and in more detail in FIGS. 1A and 1B. The continued rotation of the liquid causes the more dense phases, including the solid particles, to collect at the wall of the separator, while the less dense liquid and gas phases will move towards the central axis of the separator 104.

Clean fluid is removed from within the separator 104 through the fluid ports 136 in the lower portion of the fluid outlet conduit 128. This fluid will comprise both the less dense liquids from the annular region, as well as gas displaced downwards from the core region. This combined fluid stream exits the conduit 128 through the outlet 130 in the cap 106 and passes via the production fluid choke 132 to the fluid line 134 for further processing.

The rotational action of the liquids remaining in the separator can create a vortex, which will have the effect of causing fluid flow to be drawn up from the rotating slurry fluid and reducing the separation of the phases, in particular the separation and gradation of the solid particles. The vortex control assembly 138, in particular the vortex flow foil 140, on the lower end of the fluid outlet conduit 128 prevents the vortex from drawing slurry from the slurry separation region and passing upwards into the region around the ports 136 in the fluid outlet conduit 128. The vortex flow foil 140 also acts to push the downward fluid flow outwards towards the wall of the separation region, further enhancing solids separation.

From the separator 104, fluid passes into the solid concentrator 112. The cross-sectional area of the flowpath of the fluid is reduced along the length of the solid concentrator 112 by the combined effects of the tapered bore of the concentrator 112 and the conical fluid guide 140, causing the fluid to become concentrated in the solid particles and form a slurry.

The slurry passes to the central perforated cage 142 of the slurry container 118, where the vortex acts to rotationally agitate the fluid and entrained solids. Fluid and smaller solid particles pass outwards through the perforations 146 in the perforated cage 142 as the slurry descends within the slurry container and are removed from the annular region 144 through the outlet to pass to the slurry choke 148. Solid debris remains within the perforated cage 142 and leaves the slurry container 118 through the lower outlet 152. Depending upon the amount of debris in the stream being processed, the hydraulic or manual ROV valve 154 may be left open, to provide a continuous flow of debris, or may be opened intermittently, for example by a remote operated vehicle (ROV), to empty the bore of the slurry container when sufficient debris has been collected. The ROV may be provided with a receptacle for receiving the solid debris for removal.

Figure 3A:
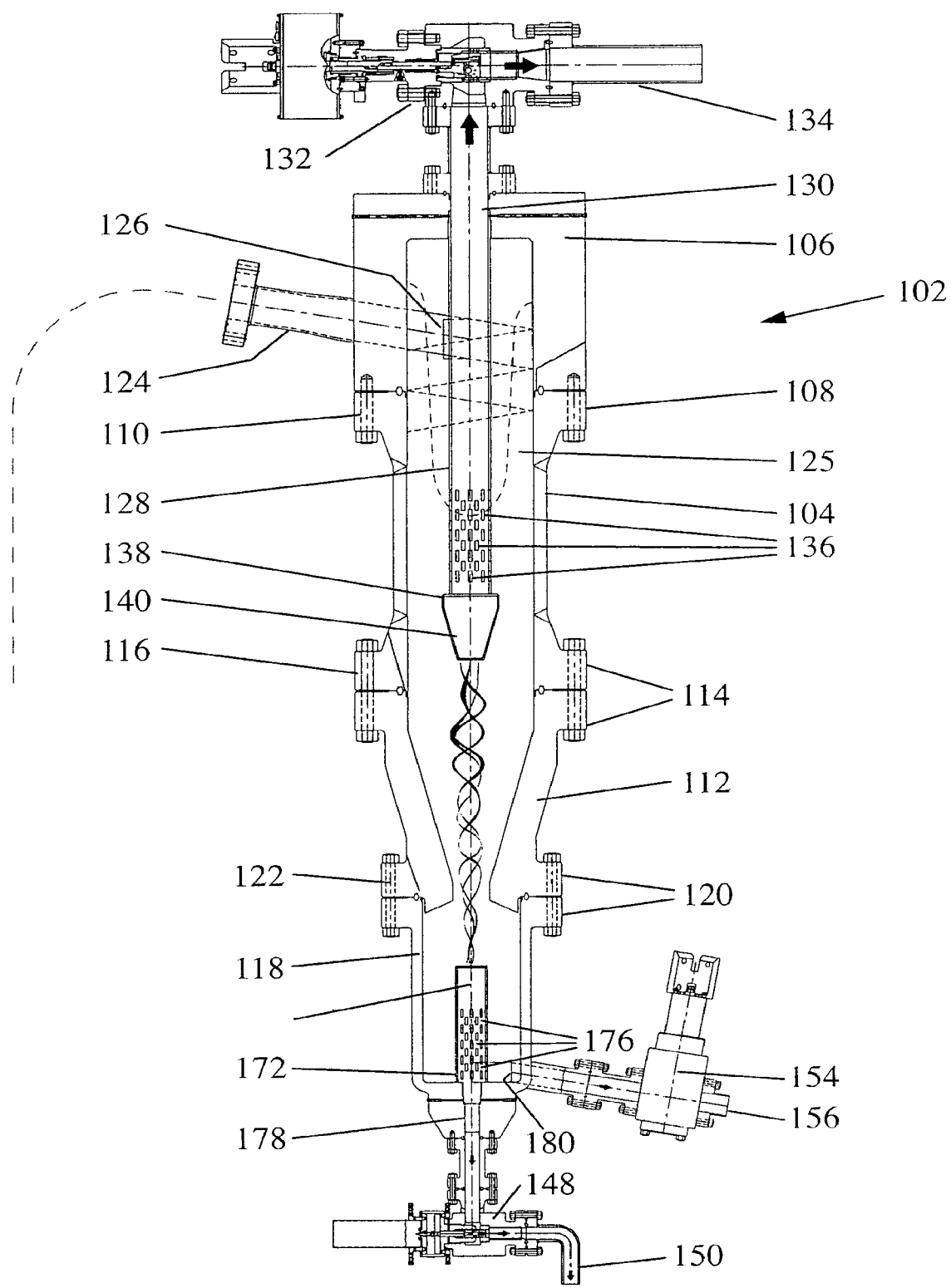
FIG. 3A is a longitudinal cross-sectional view through a separator system according to a second embodiment of the present invention.

Referring to FIG. 3A, there is shown an alternative embodiment of the separator system of the present invention. The components of the system of FIG. 3A corresponding to those of the system of FIG. 2 are indicated using the same reference numerals. The general manner of operation of the system of FIG. 3A is largely the same as that of FIG. 2. Accordingly, to avoid repetition, only the differences in construction and detailed operation between the systems of FIGS. 2 and 3A will be described.

The system of FIG. 3A comprises a slurry container 118 mounted directly on the lower end of the separator 104, the separation region being formed by the combined generally cylindrical bores of the cap 106, the separator 104 and the slurry cage 118. The lower end of the fluid outlet conduit 128 is closed with a conical cap 140. A slurry collection cage 172 extends co-axially upwards within the slurry container 118. A plurality of tangential perforations 176 are formed in the slurry collection pipe 172. The lower end of the slurry collection cage 172 connects with a slurry outlet 178 in the lower end of the slurry container 118, which in turn connects with a slurry choke 148 and slurry line 150. A tangential debris outlet port 180 is disposed in the wall of the slurry container 118 adjacent its end, which is connected to a hydraulic or manual ROV valve 154 and a debris line 156.

Figure 3B:
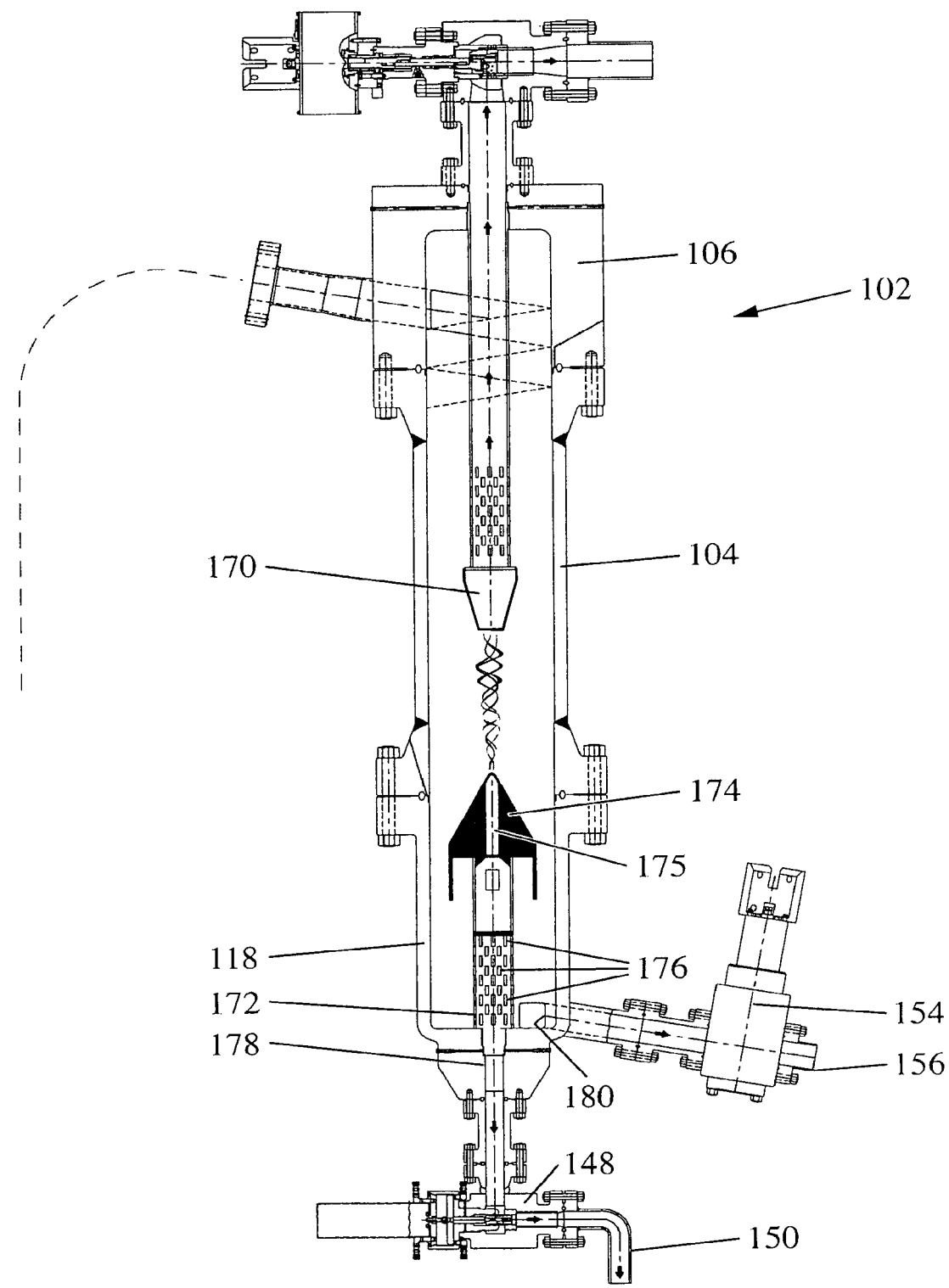
FIG. 3B is a longitudinal cross-sectional view through a separator system according to a third embodiment of the present invention.

In operation, the separator system of FIG. 3B provides an alternative means of solid concentration and solid collection. The cross-sectional area of the downstream end of the bore within the separator 104 available for the flow of fluid is reduced by means of the conical cap 174 on the slurry collection cage 172, causing an annular concentration of solids within the fluid. This causes the concentration of the solid particles within the fluid phase as the stream descends from the separator 104 to the slurry container 118 forming a region of relatively still fluid, allowing solid particles to settle and form a concentrated slurry. Fluid is removed from the slurry container 118 by passing through the tangential perforations 176 in the slurry collection pipe 172.

Referring to FIG. 3B, there is shown an alternative arrangement to that of FIG. 3A, but employing the same principle for the collection and removal of solid particles using a slurry collection cage 172. The assembly of FIG. 3B employs a generally cylindrical separator 104, the slurry container having a diameter substantially the same as that of the separator 104. To provide a constriction in the downward fluid flowpath, the slurry collection cage 172 has its upper end closed by a conical cap 174. A vent port 175 extends vertically through the conical cap 174. The vent port 175 in the conical cap 174 provides an outlet for fluid displaced from the slurry container 118.

In the slurry container 118, fluid and solid particles are caused to try and concentrate on the separator axis and to flow through the tangential slots 176 and enter the slurry collection cage 172, from where they are discharged through the slurry outlet 178, via the slurry choke 148 into the slurry line 150. Debris and very coarse solids in a fluid slurry are removed from the slurry container through the debris outlet 180 and via the hydraulic or manual ROV valve 154 into the debris line 156.

The arrangements of FIGS. 3A and 3B offers advantages over that of FIG. 2 in the case that the fluid stream contains solid particles that are easily entrained. The arrangements of FIGS. 3A and 3B provide a relatively large volume of substantially stationary fluid in the slurry container 118, surrounding the slurry collection cage. This arrangement provides an increased slurry residence time in the slurry container 118 of FIGS. 3A and 3B, compared with that of FIG. 2. Easily entrained particles are thus allowed a greater time for settling in the slurry container 118, in turn increasing the separation efficiency of the assembly.

Figure 4:
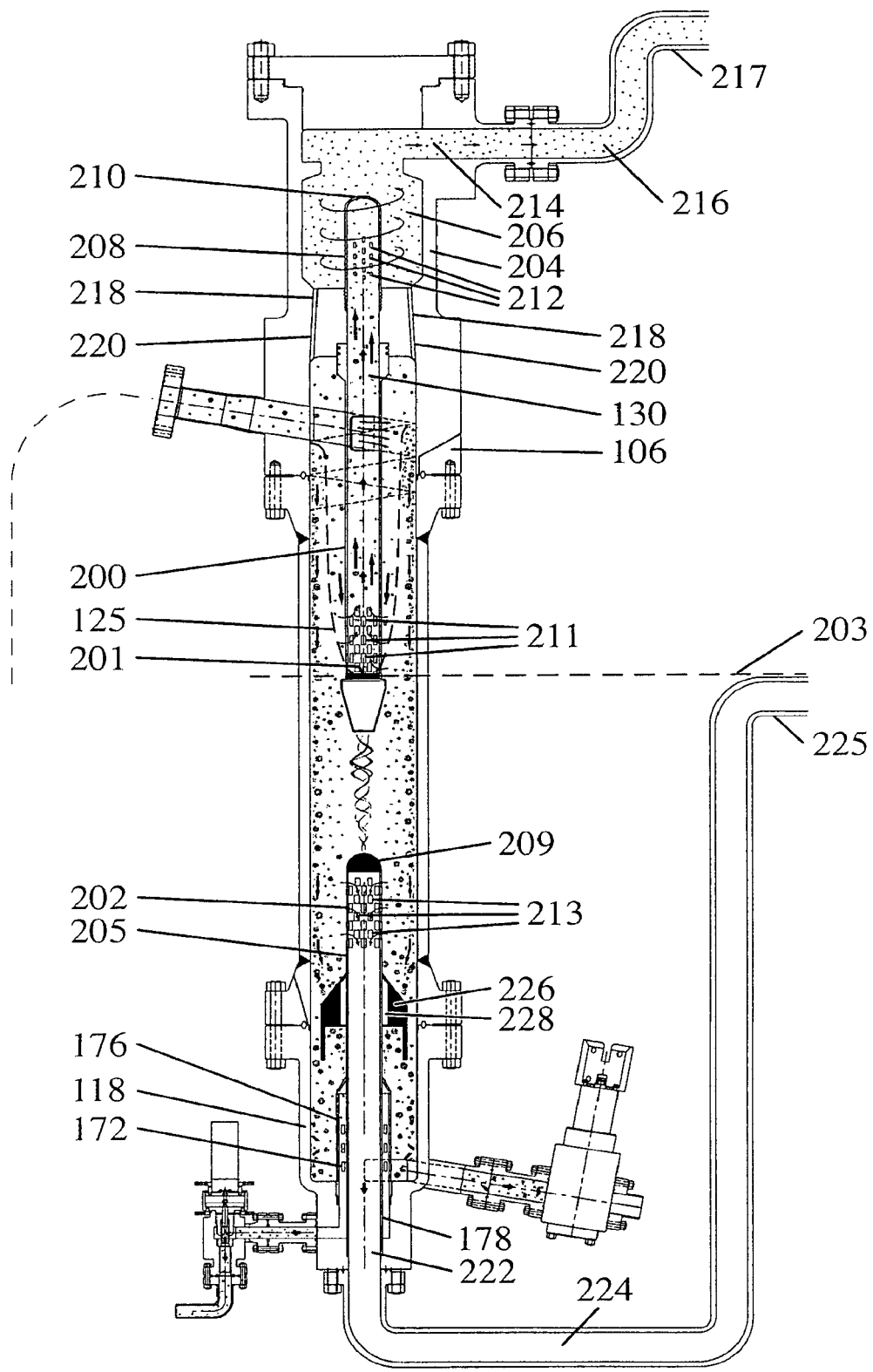
FIG. 4 is a longitudinal cross-sectional view through a separator system according to a fourth embodiment of the present invention.

Referring to FIG. 4, there is shown a further embodiment of the separator system of the present invention. The system of FIG. 4 comprises a cap, a separator and a slurry container substantially as described hereinbefore and as shown in FIG. 3 and operates in the same general manner as the system shown in FIG. 3. Accordingly, components common to the systems of both FIGS. 3 and 4 are indicated using the same reference numerals. However, the arrangement shown in FIG. 4 employs an alternative fluid collection regime, the components and operation of which will now be described in more detail.

The separation system of FIG. 4 employs a light fluid outlet conduit 200 and a heavier fluid outlet conduit 205. The heavier fluid outlet conduit 205 is arranged co-axially within the separation region and extends through the slurry container 118. The heavier fluid outlet conduit 205 extends co-axially at its lower end portion within the slurry collection cage 172, forming an annular chamber for the collection of slurry through the slots.

The light fluid outlet conduit 200 has a vortex arrestor assembly 201 at the gas liquid level 203 to hinder the formation of a vortex and prevent heavier fluid being drawn into the light fluid outlet conduit 200. The light fluid outlet conduit 200 is provided with a plurality of tangential fluid ports 211 disposed so as to open into the core region above the vortex arrestor 201. As shown in FIG. 4, the interface between the core region and annular region within the separator 104 is indicated by the dotted line 125. It is preferred that the light fluid outlet conduit 200 is of a length such that, in operation, the lower or downstream end of the core region intersects the light fluid outlet conduit 200 at or close to its lowermost end, above the vortex arrestor assembly 201.

The fluid outlet 130 in the cap 106 connects with a liquid trap 204 mounted to the upper end of the cap 106 by a flange and bolts. The liquid trap 204 comprises a central chamber 206 and a fluid feed pipe 208 extending co-axially upwards within the chamber 206 from the fluid outlet 130 in the cap 106. The fluid feed pipe 208 has its upper end sealed with a domed cap 210 and a plurality of tangential fluid ports 212 opening into the chamber 206. A tangentially arranged fluid outlet 214 is disposed in the upper portion of the wall of the liquid trap 204, which connects the chamber 206 with a fluid line 216. A plurality of drain ports 218 extend from the lower end of the chamber 206 in the liquid trap 204 to corresponding ports 220 formed in the end of the cap 106 opening into the separation region to enable liquid to be recirculated as shown in FIGS. 1A and 1B.

The heavier fluid outlet conduit 205 is capped at its upper end by a dome cap 209 and is provided in its upper portion with a plurality of tangential fluid ports 213. The heavier fluid outlet conduit 205 connects with a fluid outlet port 222 in the slurry container 118, which in turn is connected to a fluid line 224. The fluid line is shaped to form a weir 225 having a level corresponding to that of the downstream end of the core region, as indicated in FIG. 4.

A cone 226 extends around the heavier fluid outlet conduit 205 in a region below the tangential fluid ports 213. The cone 226 is provide with an annular passage 228 adjacent the outer surface of the heavier fluid outlet conduit 205, to provide a passage for fluid to pass upwards and out of the slurry container 118 for collection.

In operation, fluid is removed from the separator in two ways. First, the least dense fluid collected in the core region, most typically gas, passes through the ports 211 in the fluid outlet conduit 200 and flows in an upstream direction through the cap 106 and into the fluid feed pipe 208 in the liquid trap 204. The fluid leaves the fluid feed pipe 208 through the tangential ports 212, imparting a rotational flow pattern to the fluid in the chamber 206. Dense phases, such as liquid and any entrained solid particles, move to the wall of the chamber 106 and flow downwards, returning to the separation region within the cap 106 through the drain ports 218 and 220 and due to the angled tangential inlet flow, is entrapped and removed in the main flow stream, as shown in FIGS. 1A and 1B. The remaining fluid, typically gas, leaves the chamber 206 through the outlet 214 and passes into the fluid line 216. The fluid line 216 is shaped so as to form a gas weir 217.

Denser fluid leaves the separator downstream of the core region by passing through the ports 213 in the heavier fluid outlet conduit 205, and flows in a downstream direction within the conduit 205 through the slurry cage and into the fluid line 224 via the fluid outlet 222 in the slurry container 118.

Figure 5:
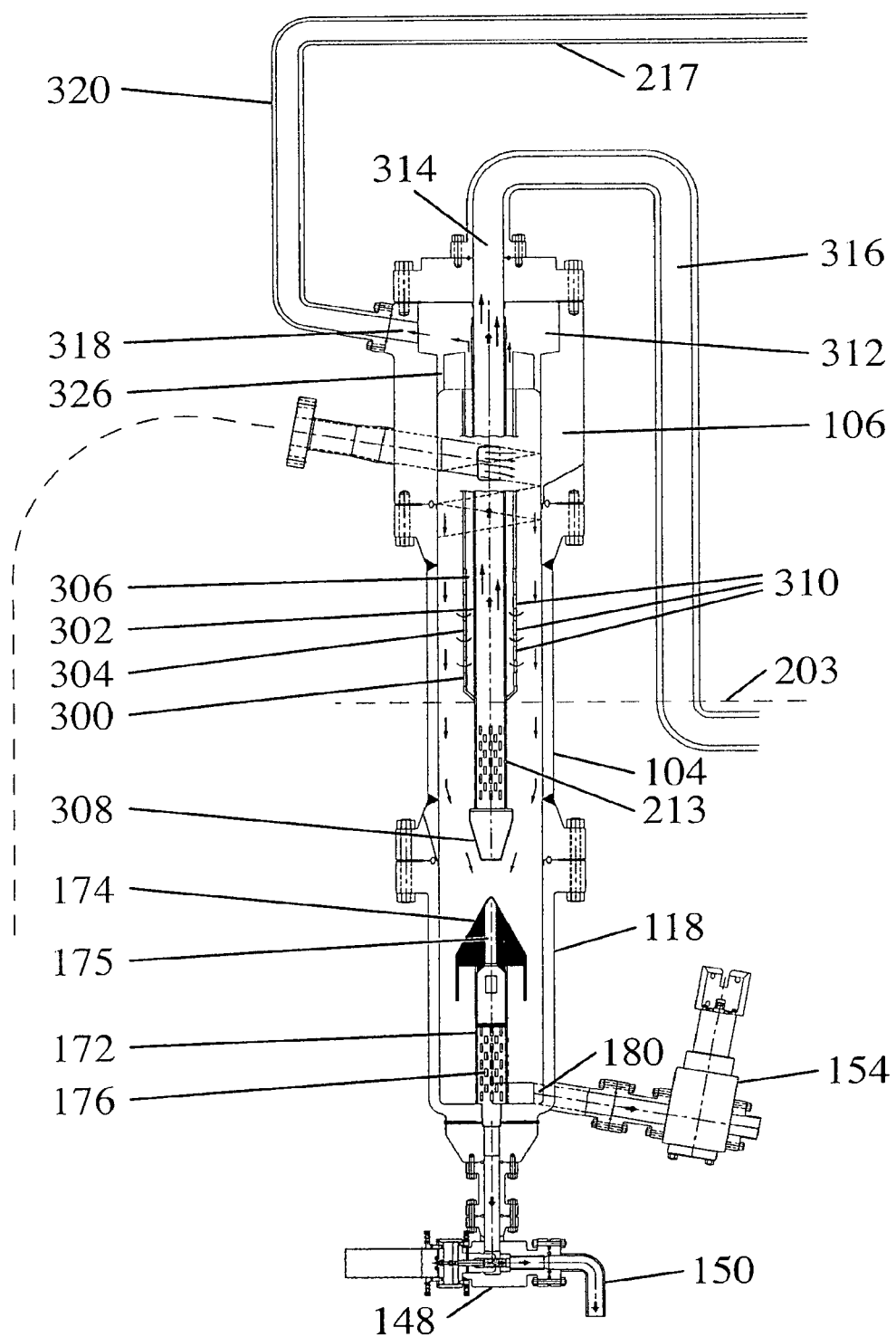
FIG. 5 is a longitudinal cross-sectional view through a separator according to a fifth embodiment of the present invention.

A further embodiment of the present invention is shown in FIG. 5. The system of FIG. 5 comprises a cap, a separator and a slurry cage substantially as described hereinbefore and as shown in FIG. 3 and operates in the same general manner as the system shown in FIG. 3. Accordingly, components common to the systems of both FIGS. 3 and 5 are indicated using the same reference numerals. However, the arrangement shown in FIG. 5 employs a further alternative fluid collection regime, the components and operation of which will now be described in more detail.

Referring to FIG. 5, a fluid collection assembly 300 extends co-axially within the separation region from the end of the cap 106 to the region of the junction between the separator 104 and the slurry container 118. The fluid collection assembly 300 comprises inner and outer conduits 302 and 304 arranged concentrically so as to form an annular channel 306 between the two. The lower end of the outer conduit 304 is closed. In operation, the lower end of the outer conduit 304 will lie at the gas/liquid level 203. A plurality of fluid ports 310 are provided in the outer conduit 304 and correspond in form, arrangement and function to the ports 211 shown in FIG. 4 and described above.

The inner conduit 302 extends within the outer conduit 304 and projects from the lower end of the inner conduit 302, such that its lower end is disposed below the core region, when the separator system is in operation. The inner conduit 302 is provided in its lower end portion with fluid ports 213 of the type described and shown in FIG. 4. A vortex arrestor assembly 308 is disposed on the lower end of the inner conduit 302.

The cap 106 is provided with an annular liquid knockout chamber 312 connected to the annulus 306 in the fluid collection assembly 300. The inner conduit 302 extends through the annular liquid knockout chamber 312 to a first fluid outlet 314 in the end of the cap 106, which in turn connects to a fluid line 316. The cap comprises a second fluid outlet 318 in the wall of the liquid knockout chamber 312, which is connected to a fluid line 320.

The fluid line 316 extends from the cap 106 to a level below the effective end of the outer conduit 304 of the fluid outlet assembly 300. In this way, the flow of fluid through the fluid line 316 provides a siphon to aid fluid removal from the separator.

The liquid knockout chamber 312 is connected to the separation region within the cap 106 by means of a plurality of fluid return ports 326.

In operation, fluid enters the fluid outlet assembly 300 through the ports 310 in the outer conduit 304 from both the core region and the outer annular region of the separator 104. The low density fluid from the core region passes upwards through the annulus 306 into the liquid knockout chamber 312 in the cap 106. In the scenario described hereinbefore, this will consist mostly of gas. Higher density components, such as liquid, are removed from the low density fluid in the liquid knockout chamber 312 and return to the separation region in the cap by way of the return ports 326. The low density fluid leaves the cap through the second fluid outlet 318 and enters the fluid line 320, which is shaped so as to form a gas weir 217.

Fluid from the annular region of the separator is drawn into the inner conduit 302 and passes upwards through the cap 106 and leaves via the first fluid outlet port 314. In the scenario outlined above, this fluid will consist essentially of liquid, with some entrained gas. The remaining fluid in the fluid line 316 is passed to downstream equipment for further processing.

It has been found that an assembly according to the present invention as shown in the accompanying figures can separate a combined stream of crude oil, water and solid debris at flowrates up to 25,000 BPD at very high efficiency. In addition, the assembly can operate with a very high turn down ratio, that is a given assembly can operate over a wide range of fluid flowrates. For example, the assemblies shown in the accompanying figures can operate as low as 5,000 BPD to separate a combined crude oil, water and solids stream. Below these flowrates, separation of the components due to fluid rotation diminishes and the assembly will operate under gravity separation principles. Accordingly, separation at flowrates from zero upwards may be achieved.

Figure 6:
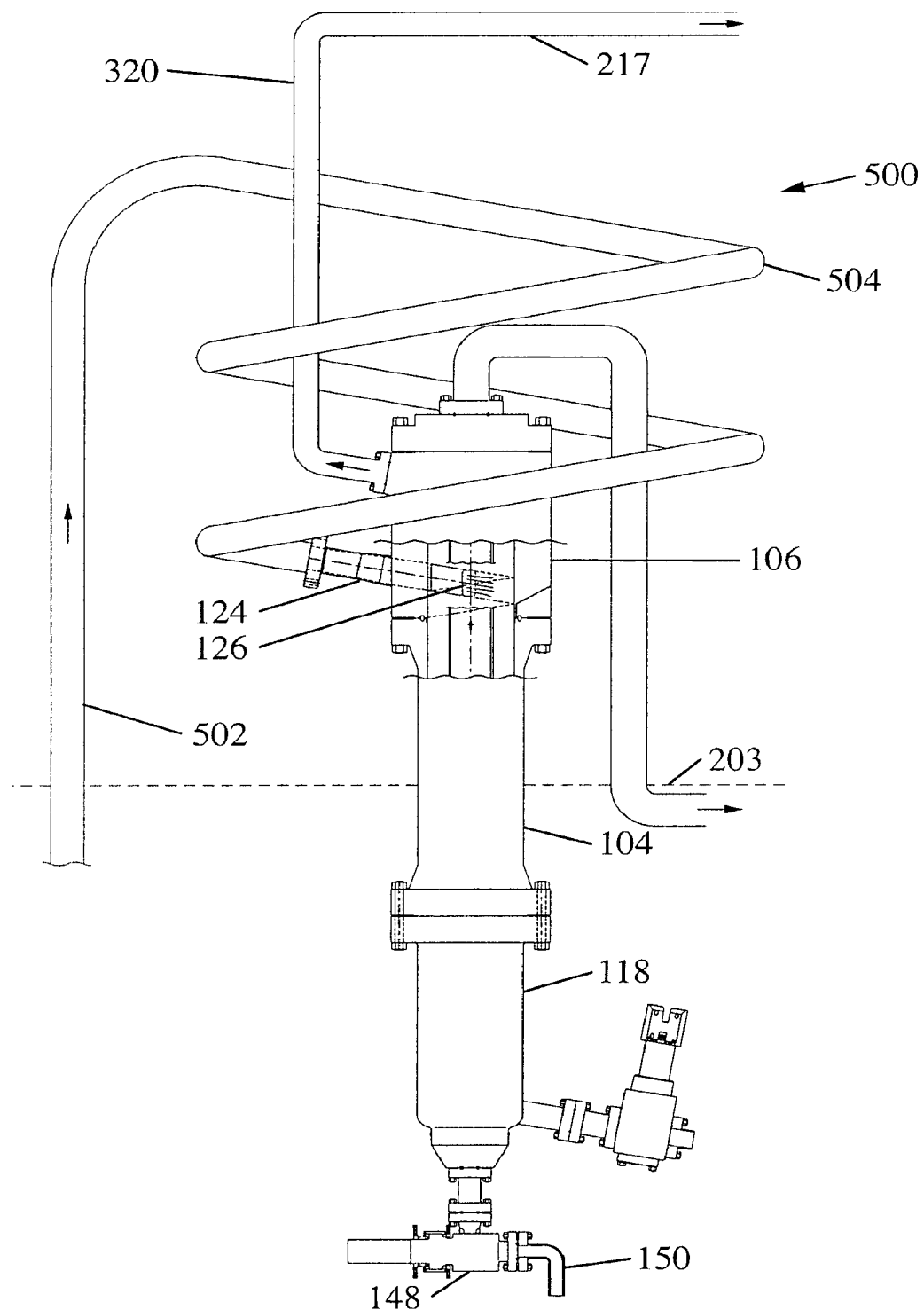
FIG. 6 is a partial cross-section view through a separator according to a sixth embodiment of the present invention.

Referring to FIG. 6, there is shown a separation assembly according to the present invention incorporating an inlet assembly according to the final aspect of the present invention. Features of FIG. 6 common to other embodiments of the present invention are indicated using the same reference numerals. The inlet assembly, generally indicated as 500, comprises a feed conduit 502 through which a fluid to be separated is fed to the assembly. The inlet assembly 500 further comprises an arcuate conduit 504 through which fluid may be conveyed to feed pipe 124 and the inlet 126.

As shown in FIG. 6, the arcuate conduit 504 extends in a helical pattern, with the fluid completing two complete turns between the feed conduit 502 and the inlet 126. It will be appreciated that the arcuate conduit 504 may be arranged in a different configuration, for example a helical pattern with greater or fewer turns, as may be required. As shown in FIG. 6, the arcuate conduit 504 is a helical pipe. It will be appreciated that an arcuate flowpath for the fluid may be obtained by providing an arcuate conduit of a different configuration.

In operation, a fluid stream to be separated in the separation assembly first flows along the arcuate conduit 504, within which the components of the fluid stream begin to separate according to their relative densities. Thus, the heavier components, for example liquids, such as water, and solids, will tend towards the radially outer regions of the conduit. In contrast, the lighter components, such as light liquids, for example oil, and gases, will tend to the radially inner portion of the conduit. The conduit 504 and the inlet 126 are arranged such that fluid stream is properly oriented with the flow patterns prevailing within the separation region. Thus, the heavier components enter the separator 104 in a radially outer position and the lighter components enter the separator 104 in a radially inner position. It will thus be appreciated that the separation initialised within the arcuate conduit 504 supplements the separation taking place within the separator 104.

Figure 7:
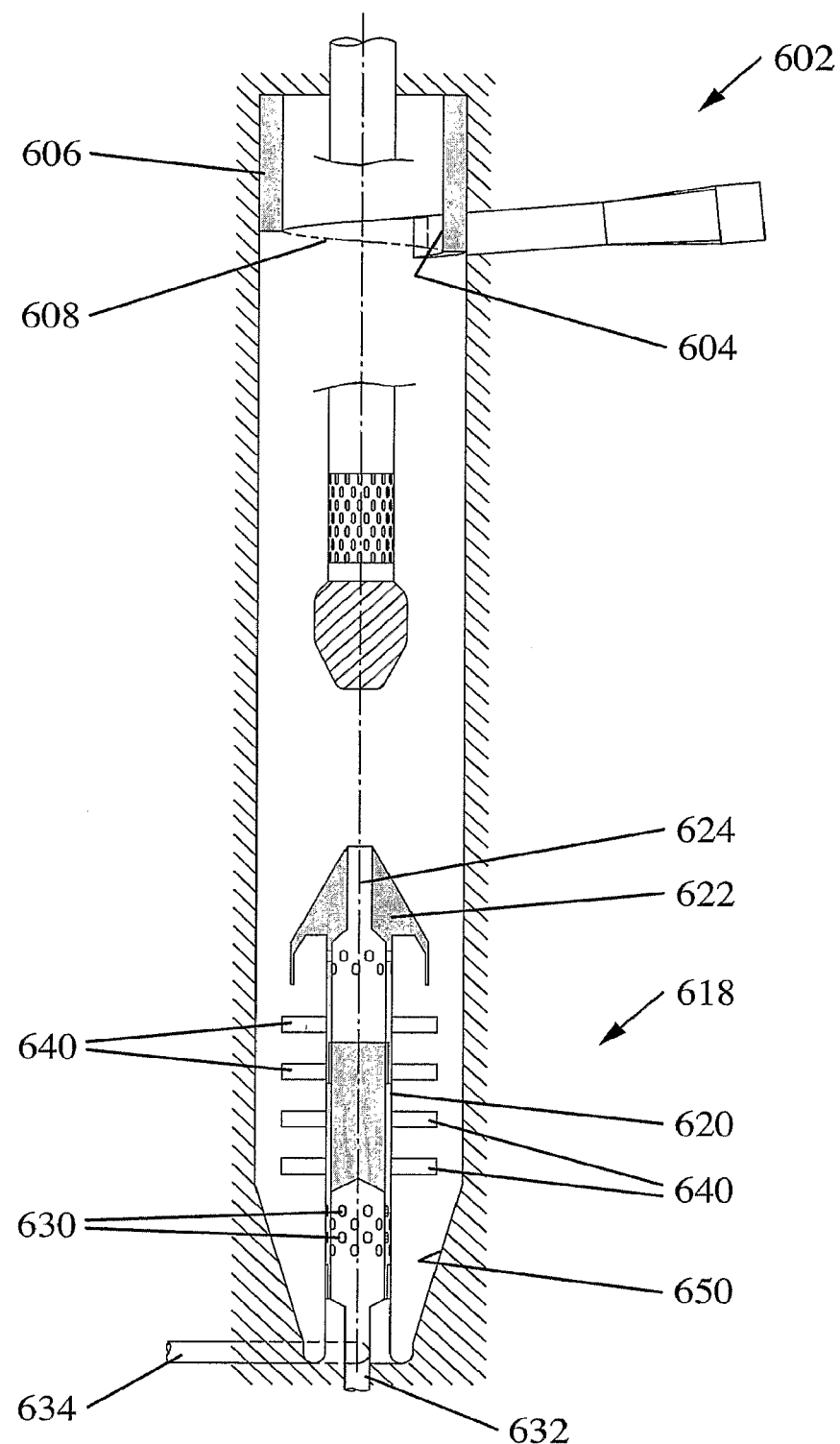
FIG. 7 is a cross-sectional view through the inlet and separation regions of a separator according to a seventh embodiment of the present invention.
Figure 8:
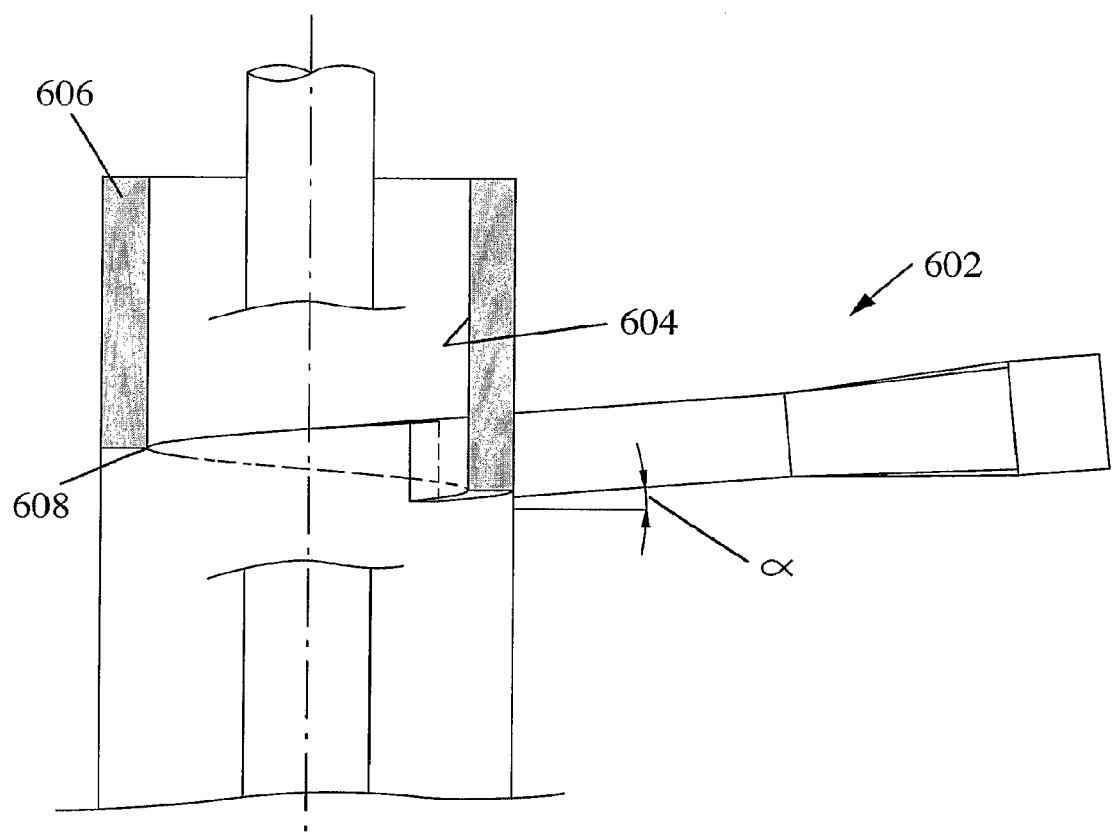
FIG. 8 is an enlarged cross-sectional view of the fluid inlet region of the separator of FIG. 7.

Referring to FIGS. 7 and 8, there is shown a separator according to a further embodiment of the present invention. The separator has the same general configuration as that of FIG. 4 and the components common to the embodiment of FIGS. 7 and 8 and FIG. 4 are identified using the same reference numerals. Reference to the foregoing detailed description is made with respect to these common features and components. The following description relates to the features particular to the separator of FIGS. 7 and 8. For clarity, FIGS. 7 and 8 show only the internal components of the separation system, with the external components, such as the inlet assembly, and fluid and solid outlet assemblies being omitted.

The separation assembly of FIG. 7 has a tangential inlet assembly 602, as hereinbefore described, through which a fluid stream is introduced into the upstream region of the separation region. The inlet assembly 602 has an inlet opening 604 that opens into the separation region some distance from the upstream end of the separation region. A wall assembly 606 is provided having a helically extending guide surface 608 disposed such that incoming fluid contacts the guide surface 608 and is caused to flow in a helical pattern downwards within the separation region. The inlet region is shown in more detail in FIG. 8, with the wall assembly 606 and the guide surface 608 being shown in greater detail. The presence of the wall assembly 606 allows the inlet assembly 602 to be angled more closely to the perpendicular to the longitudinal axis of the separation region, while still allowing the incoming fluid stream to develop the required helical flow pattern within the separation region. Thus, the angle α of the inlet conduit as shown in FIG. 8 is approximately 5°. A further effect of the wall assembly and the use of the guide surface 608 is to ensure that the incoming fluid is not caused to contact and impact the fluid already rotating within the separation region. This in turn reduces the shear to which the fluid is subjected, improving the separation efficiency of the system.

The separator of FIG. 7 further comprises a slurry container 618 and slurry collection assembly, generally as hereinbefore described, in particular as shown in FIG. 3B. The separator comprises a slurry cage 620. To provide a constriction in the downward fluid flowpath, the slurry collection cage 620 has its upper end closed by a conical cap 622. A vent port 624 extends vertically through the conical cap 622. The vent port 624 in the conical cap 624 provides an outlet for fluid displaced from the slurry container 618.

In the slurry container 618, fluid and solid particles are caused to try and concentrate on the separator axis and to flow through the tangential slots 630 and enter the slurry collection cage 620, from where they are discharged through the slurry outlet 632. Debris and very coarse solids in a fluid slurry do not enter the slurry cage 620 and are removed from the slurry container through the debris outlet 634. The slurry collection cage 620 of the separator assembly of FIG. 7 is extended in length, compared with that shown in FIG. 3B. To reduce the rotation of the fluid stream in the slurry container 618 and enhance the separation of solids and fluids, the slurry cage 620 is provided with a plurality of baffles 640 extending radially outwards across the slurry container. The baffles 640 are of such a size, number and pitch as to ensure that the fluid stream is sufficiently slowed but still moving enough to provide for easy purging of the solid slurry through the debris outlet 634.

To enhance the separation of solids from the fluid phases, the inner wall of the slurry container 618 is provided with a conical portion 650 adjacent the debris outlet 634, in order to reduce the cross-sectional area of the slurry container in the downstream direction.

Figure 9:
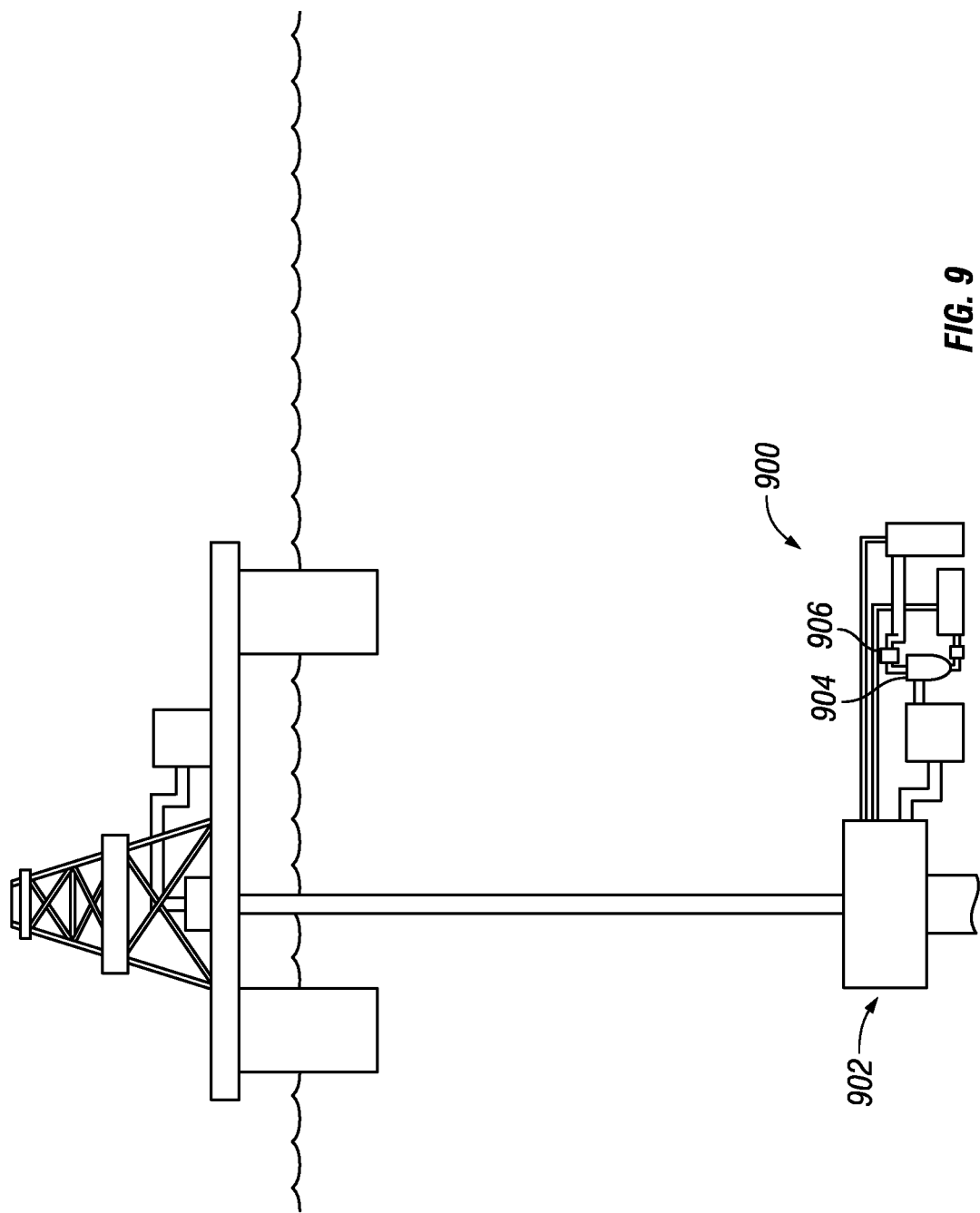
FIG. 9 is a representative view of a subsea processing assembly using a separator assembly in accordance with various embodiments.

Referring to FIG. 9, there is shown a subsea processing assembly 900 comprising a wellhead assembly 902 through which fluids are produced from a subterranean well. The subsea processing assembly 900 also includes a separator assembly 904 having a fluid inlet connected to the wellhead assembly for receiving the fluids produced from the well, the separator assembly being operable at wellhead pressure to remove well debris entrained in the fluids to produce a solids-rich phase and a fluid phase, the separator assembly 904 comprising a fluid outlet for the fluid phase. The subsea processing assembly also comprises a choke assembly 906 (similar to the choke 132 discussed above) having an inlet connected to the fluid outlet of the separator assembly 904.

Figure 10:
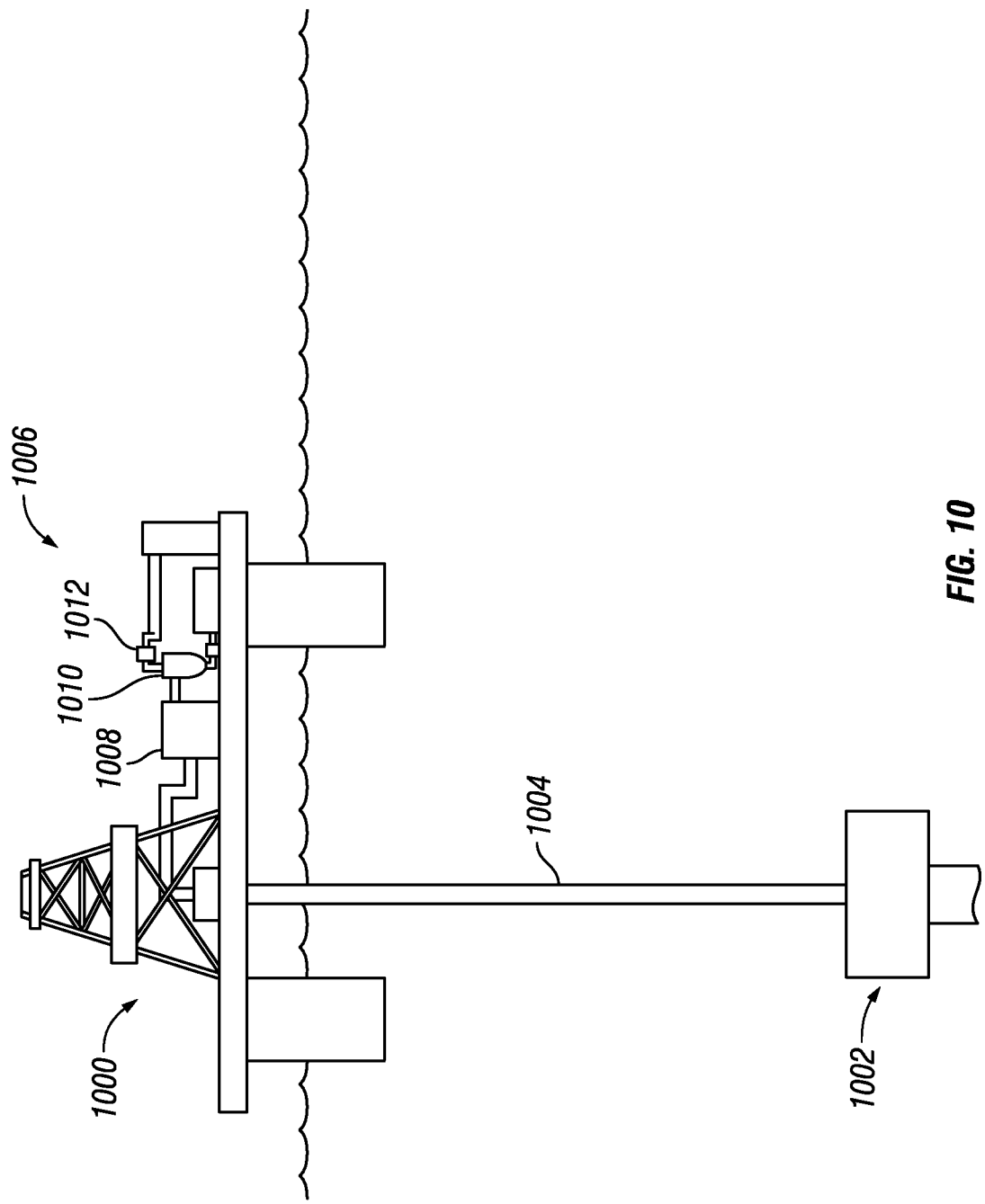
FIG. 10 is a representative view of a platform processing assembly using a separator in accordance with various embodiments.

Referring to FIG. 10, the separation assembly of the present invention may be employed on an offshore platform 1000 receiving production fluids directly from either platform wellheads or a subsea wellhead 1002 through a riser 1004 or the like upstream of the choke (similar to the choke 132 discussed above). Accordingly, in a further aspect, the present invention provides a platform processing assembly 1006 comprising a fluid receiving assembly 1008 for receiving fluids produced from a subterranean well. The platform processing assembly 1006 further comprises a separator assembly 1010 having a fluid inlet connected to the fluid receiving assembly 1008 for receiving the fluids produced from the well, the separator assembly 1010 being operable at wellhead pressure to remove well debris entrained in the fluids to produce a solids rich phase and a fluid phase, the separator assembly 1010 comprising a fluid outlet for the fluid phase. The platform processing assembly 1006 further comprises a choke assembly 1012 having an inlet connected to the fluid outlet of the separator assembly 1010.

What is claimed is:

1. An apparatus for separating a multiphase fluid stream comprising a relatively high density fluid and/or solid component and a relatively low density fluid and/or solid component, the apparatus comprising:
a separation region;
an inlet to introduce the multiphase fluid stream into the separation region;
an arcuate conduit for conveying the multiphase fluid stream to the inlet; and
wherein the arcuate conduit and the inlet are arranged to introduce the fluid stream into the separation region in an orientation corresponding to that of the fluid within the separation region during operation.

2. The apparatus of claim 1, wherein the arcuate conduit is helical.

3. The apparatus of claim 2, wherein the arcuate conduit comprises a helical pipe.

4. The apparatus of claim 2, wherein the arcuate conduit comprises two complete turns.

5. The method of claim 1, wherein the multiphase fluid stream comprises at least one fluid phase and a solid phase.

6. The method of claim 1, wherein the multiphase fluid stream comprises a liquid phase and a gaseous phase.

7. The method of claim 1, wherein the multiphase fluid stream comprises two immiscible liquid phases.

8. The method of claim 1, wherein the multiphase fluid stream is produced from a subterranean well.

9. A method of separating a multiphase fluid stream comprising a relatively high density fluid and/or solid component and a relatively low density fluid and/or solid component, the method comprising:
introducing the multiphase fluid stream into a separation region in a manner to introduce a rotational flow pattern within the separation region; and
prior to introducing the multiphase fluid stream into the separation region, flowing the multiphase fluid stream along an arcuate flowpath in an orientation corresponding to the rotational flow pattern within the separation region.

10. The method of claim 9, further comprising forcing the incoming fluid to flow along a circular or helical path prior to entering the separation region.

11. The method of claim 9, wherein the arcuate flowpath is helical.

12. The method of claim 9, wherein the multiphase fluid stream in the arcuate flowpath is flowing in a laminar or transitional flow regime.

13. The method of claim 9, wherein the multiphase fluid stream comprises at least one fluid phase and a solid phase.

14. The method of claim 9, wherein the multiphase fluid stream comprises a liquid phase and a gaseous phase.

15. The method of claim 9, wherein the multiphase fluid stream comprises two immiscible liquid phases.

16. The method of claim 9, wherein the multiphase fluid stream is produced from a subterranean well.

* * * * *